US009275409B2

(12) United States Patent
Mebed et al.

(10) Patent No.: US 9,275,409 B2
(45) Date of Patent: Mar. 1, 2016

(54) METHOD, MEDIUM, AND SYSTEM FOR BUILDING A PRODUCT FINDER

(75) Inventors: Waheed Mebed, Fountain Valley, CA (US); Dmitry Chechuy, Ladera Ranch, CA (US)

(73) Assignee: CBS Interactive Inc., San Francisco, CA (US)

( * ) Notice: Subject to any disclaimer, the term of this patent is extended or adjusted under 35 U.S.C. 154(b) by 804 days.

(21) Appl. No.: 13/442,952

(22) Filed: Apr. 10, 2012

(65) Prior Publication Data

US 2013/0268408 A1     Oct. 10, 2013

(51) Int. Cl.
*G06Q 30/00* (2012.01)
*G06Q 30/06* (2012.01)

(52) U.S. Cl.
CPC ........ *G06Q 30/0627* (2013.01); *G06Q 30/0641* (2013.01)

(58) Field of Classification Search
CPC .......... G06Q 30/0631; G06Q 30/0601; G06Q 30/0641
USPC ....................................................... 705/27.1
See application file for complete search history.

(56) References Cited

U.S. PATENT DOCUMENTS

| | | | | |
|---|---|---|---|---|
| 2007/0271149 | A1* | 11/2007 | Siegel | G06Q 30/0603 705/26.41 |
| 2008/0097843 | A1* | 4/2008 | Menon | G06Q 30/02 705/14.1 |
| 2009/0271289 | A1* | 10/2009 | Klinger | G06Q 30/0601 705/26.1 |

OTHER PUBLICATIONS

Aug. 1999—https://datamining.bus.utk.edu/Documents/Decision-Trees-for-Predictive-Modeling-(Neville).pdf.*

* cited by examiner

*Primary Examiner* — Matthew Zimmerman
(74) *Attorney, Agent, or Firm* — Marc S. Kaufman; Amardeep S. Grewal; Reed Smith LLP

(57) ABSTRACT

The principles set forth herein describe building a product finder. One aspect comprises receiving a request at a computing device to develop a product finder for a specified product category; receiving input at the computing device to configure the product finder, the input comprising data representing product information associated with the specified product category; developing, via a processor accessible by the computing device, the product finder based on an existing template, wherein developing the product finder based on the existing template reduces writing of computer code; and utilizing the input to customize the product finder. Other embodiments are disclosed herein.

18 Claims, 18 Drawing Sheets

FIG. 2

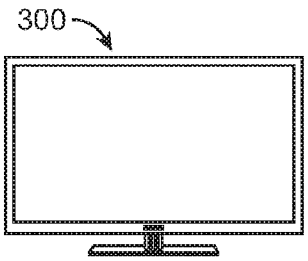

300 ↖

Samsung - 51" Class / 720p / 600Hz / Plasma HDTV
Model: PN51D450A2 | SKU: 2135081
Customer Reviews: ★★★★★ 4.5    Read reviews (17)
Delivery: Most areas    Check Dates    Our Price:    $799.99
Store Pickup: Check Stores            See price at checkout >
Special Offers:
    $199.99-274.99 Mount & Service :    See How
Financing:
    18 Month Financing    6 Month Financing Overview    Specifications    Accessories    Customer Reviews    Learn

301 ↙

Customer Rating
★★★★★ 4.5
Read reviews (17)
Write a review
Share this product:

Overall Samsung.com Rating
★★★★★ 4.8
Read reviews from Samsung.com customers    (6)

ENERGY STAR
Qualified

Enjoy stunning high-definition images with this 51" flat-panel plasma HDTV that supports up to 720p signals. Dual HDMI inputs allow single-cable connections to your components.

Have questions about this product?
Ask Mr. Samsung, fellow shoppers and Best Buy staff. Share your answers.
Product Q&A
17 Questions    23 Answers
Ask. Answer. Learn.

What's Included
• Samsung 51" Class / 720p / 600Hz / Plasma HDTV
• Owner's manual

Product Features
• 51" Screen
• Ultraslim design (2-1/4" deep)
• 600Hz Subfield HD Motion technology
• 0.001 ms response time
• 720p display
• Two 10W speakers
• Inputs
• 2 HDMI Inputs. HDMI cable not included.

Great tv for the price.
★★★★★ 5.0
Posted by: Wilcox from Queensbury, NY on 05/18/2011

| | |
|---|---|
| I have never had a plasma before and I truly love it. When I am watching games on it I feel like I am really in the stands with the other people. The HD channels are off the hook. My 51' is the bomb :) What's great about it: The picture is so clear and amazing to watch. What's not so great: Not one thing!! | Picture Quality ▬▬▬▬ 5.0 Sound Quality ▬▬▬▬ 5.0 Features ▬▬▬▬ 5.0 |

FIG. 3

Television Website

TV Show "Title 123" Airs Tonight!

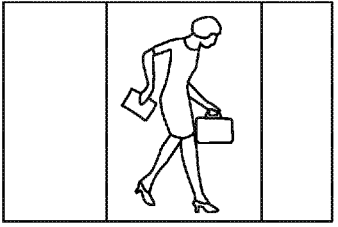

Catch premiere of the all new series "Title 123"! Find out if Jane Doe is able to slay vampires while maintaining a full-time day job! This show will air in full 1080p, so you can watch it on your High Definition Television (HDTV).

New Episode of "Title 456" at 9PM

Catch an all new episode of "Title 456" at 9:00PM tonight. Find out what happens when Jill tells Jack that she adopted a pet. You can also watch this on your home computer with online video streaming!

FIG. 17

METHOD, MEDIUM, AND SYSTEM FOR BUILDING A PRODUCT FINDER

FIELD OF TECHNOLOGY

The present disclosure generally relates to building an online product finder and, more particularly, to building a product finder accessible on a website through a widget.

BACKGROUND

Purchasers of consumer electronics (CE), such as personal computers, digital media players, cellular phones, hard disk drives, and the like, want detailed information regarding product features and specifications to aid them in making informed purchasing decisions. Manufacturers typically provide such information for their products, but this information may not be normalized between different manufacturers. In addition, some manufacturers may use proprietary names for the same features in an attempt to differentiate themselves from the competition. For example, a manufacturer may call a display "qHD" instead of "960×540 pixels," which may be the more typical name in the industry. This can confuse consumers as they are not likely to understand the difference, if any, between the various ways that manufacturers may describe similar features.

Therefore, manufacturers could aid consumers in making purchasing decisions by, inter alia, normalizing product information and presenting the information to consumers in a consistent manner. However, it can be very burdensome for each retailer to create its own database of product information. At any time, retailers may be offering hundreds or thousands of products, thereby making it highly expensive, or even impossible, to create a database of all product information. In addition, there is a very high turnover in the CE marketplace, as products are constantly being updated and replaced. Thus, product information databases must be revised constantly.

Furthermore, it can also be very burdensome for each retailer or manufacturer to create its own storefront (e.g., an electronic storefront on a retailer or manufacturer website), for example, to provide product information and retail functions. A retailer or manufacturer will likely need to devote a large amount of time and/or resources to develop a fully functional electronic storefront. In addition, after an electronic storefront has been established, more costs may be required to sustain functionality. For example, any product information provided by the storefront must be maintained and updated. Moreover, consumers require certain functions, such as a search function allowing customers to browse through products. Thus, a retailer or manufacturer may need to spend significant time, effort, and resources to provide adequate electronic storefront functionality, such as a search function.

SUMMARY

Additional features and advantages of the embodiments disclosed herein are set forth in the description which follows, and in part will be obvious from the description, or may be learned by practice of the described technologies. The features and advantages of the embodiments may be realized and obtained by means of the instruments and combinations particularly pointed out in the appended claims. These and other features of the disclosed embodiments will become more fully apparent from the following description and appended claims, or may be learned by the practice of the disclosed concepts as set forth herein.

Disclosed are systems, methods, devices, and computer-readable storage media for an electronic storefront configured to present product information in substantially real-time. Embodiments may also be at least partly implemented as instructions contained in or on a non-transitory computer-readable medium, which may be read and executed by one or more processor circuits to enable performance of the operations described herein. An electronic storefront as disclosed herein may be provided through a website, which may include a widget that provides data, such as product information, through the electronic storefront in substantially real-time. For example, a website developer may be provided with a snippet of computer code for generating a JavaScript® hook or widget, thereby obviating the need for the developer to produce customized computer code for the an electronic storefront, which can potentially save time and money. JavaScript® is a registered trademark of Oracle America, Inc. The electronic storefront widget may be displayed in substantially real-time to a visitor of a webpage when a visitor interacts with a product display object, for example, by placing or rolling a mouse pointer over text containing a product name of a certain product, such as a consumer electronic (CE) product. The widget may retrieve from an external product reference resource, such as a server and/or database, data relating to product information for one or more products. The retrieved data may be displayed to a web site visitor in substantially real-time via the storefront widget.

The storefront widget may include a mash-up of other services, including, but not limited to, a mapping feature and a shopping feature. The storefront widget may include a group of widgets (e.g., widgets within the widget). A store widget and a map widget may combine and collaborate together within the storefront widget. Accordingly, the storefront widget may show product location and availability via the map feature or map widget while allowing customers to browse products and make purchases via the store widget.

As disclosed herein, products may include CE products, such as televisions (TVs) (e.g., high definition TVs (HDTVs)), DVD players, cell phones (e.g., smartphones), computing devices (e.g., laptops, personal computers (PCs), tablet computing devices), cameras, audio recording and playing devices, and the like. Data relating to product information may include brand name, manufacturer, product name, model type/number, product description, price, product reviews, user/consumer reviews, features, dimensions, and product availability and location(s) (e.g., addresses of retail stores with product currently in stock). Products may additionally include media products such as music, movies, books, and TV shows. For example, an electronic storefront widget as disclosed herein may be displayed on a webpage where media is mentioned (e.g., a blogger on a blog site may publish content about his favorite book, a person on a social networking site may post a movie title, or a web user may update a status message to reflect a song he is listening to at the moment). As such, an electronic storefront widget may be displayed for various media products as a person browsing these sites (i.e., potential consumer) places a mouse pointer over them. The electronic storefront widgets may be configured to provide the full product name (e.g., title), author, director, producer, editor, cast, a sample media clip, excerpt or abstract, price, and other information about the media product. In addition, electronic storefront widgets may incorporate clickable button(s) for convenient shopping (e.g., "Purchase," "Bid," "Add to cart," "Process").

A webpage may include a video displaying product(s). A widget may be displayed to a visitor of a webpage to provide information and data relating to the product(s) in the video. For example, if the video has been tagged with one or more keywords, such as "Brand Name Camera Model XYZ," then the electronic storefront widget may be made available to the visitor to display product information about the camera (e.g., when the visitor places a mouse pointer over the product shown in the video, or when the visitor moves a mouse pointer over the video tag/keyword). Similarly, if the video properties state which camera was used to record the video, then the widget may also display product information about that camera to the visitor. In addition, if the video description mentions the camera, the widget may display product information about that particular camera.

Webpages often present audio mentioning or promoting certain product(s). A widget may be displayed to a visitor of the webpage to provide information and data relating to the product(s) mentioned in the audio. For example, if the audio has been tagged with one or more keywords, such as "Brand Name Microphone Model XYZ," then the widget may be made available to the visitor to display product information about the microphone. Similarly, if the audio properties or description mentions the microphone, then the widget may also display product information about the microphone to the visitor. In addition, speech-to-text software may be used to decipher the audio into text. If the audio and/or text mention the microphone, the widget may display information about it.

A webpage may present an image depicting product(s). For example, the image may have a description or tags describing or associated with the product(s). Any products mentioned may be provided by a widget as described herein. In addition, a person's face displayed in an image provided on the webpage can be deciphered using facial recognition software. The person can be an author, singer, actor, or athlete associated with one or more products, including media products. Media and other products associated with the person may be provided by the widget. Similarly, any other products (e.g., a particular digital camera) recognized in the image may also be provided by the widget.

Webpages may additionally present or link to a game which may include real and/or virtual products. For example, in a Role Playing Game (RPG), a real or virtual item may be presented as a product via a widget, or, in a racing game, a car within the game may be presented as a product via a widget. Moreover, the game may utilize real or virtual currency for shopping. As such, widgets as disclosed herein may provide a storefront for using real and/or virtual currency.

A webpage may present a restaurant or other business, such as a retail business. A widget may be configured on the webpage to provide meal vouchers, coupons, tickets, or any other merchandise/products mentioned or associated with the restaurant or other business.

External product reference resources as described herein may aggregate request data from the widget. Such data may include product data, and, in aggregate, may indicate consumer interest in a product. In addition, the widget may also return data useful in building a profile regarding a user, including demographic data, user identification data, behavioral data, and the like. Furthermore, the external product reference resource may also aggregate purchase data based on products purchased through one or more interfaces provided by the widget.

Also described herein are processes and products configured to develop search functionality to find products. A client (e.g., website owner/developer, online retailer) may request a product finder builder to develop a product finder. For example, the client may submit input, such as product information relating to a product and/or product category, specifying for the focus of the product finder. The product finder builder may, for example, develop a product finder from an existing template, wherein the client's input may be used to customize the product finder. The product finder and/or the product finder builder may be presented as a widget on a website.

The developed product finder may provide a genus-level specification sheet with active labels for specification values that allow an end user (e.g., online customer, webpage viewer) to narrow items from genus to species (e.g., to find a particular product model). The product finder may additionally allow an end user to browse from a general level to a more specific level. The developed product finder may also provide (e.g., via buttons, hyperlinks, sliding buttons) interactive general product characteristics which may lead to narrower product characteristics. Such features may ultimately guide a user to more effectively and efficiently find products matching one or more search criteria.

BRIEF DESCRIPTION OF THE DRAWINGS

In order to best describe the manner in which the above-described embodiments are implemented, as well as define other advantages and features, a more particular description is provided below and is illustrated in the appended drawings. Understanding that these drawings depict only exemplary embodiments and are not therefore to be considered to be limiting in scope, the examples will be described and explained with additional specificity and detail through the use of the accompanying drawings in which:

FIG. 2 illustrates an exemplary embodiment including a widget used on a website for accessing the product information of FIG. 1 and providing a storefront;

FIG. 3 illustrates an exemplary embodiment including a more customized widget for accessing product information and providing a storefront on a website;

FIG. 17 illustrates an exemplary embodiment including a widget for accessing a product finder having retrieved results from a search query.

DETAILED DESCRIPTION

Various embodiments are discussed in detail below. While specific embodiments are discussed herein, it should be understood that this is done for illustrative purposes only. A person skilled in the relevant art will recognize that other embodiments, implementations, variations, steps, and/or orders of steps may be used without departing from the spirit and scope of the disclosed embodiments.

Electronic commerce ("e-commerce") encompasses the buying and selling of products and services (referred to herein collectively as "products") over electronic systems such as the Internet and other computer networks. E-commerce typically uses the World Wide Web at least at some point in the transaction's lifecycle, although it can encompass a wider range of technologies, such as e-mail based commerce, procured application marketplaces, electronic provision of services, and so forth. E-commerce sellers (e.g., original equipment manufacturers (OEMs), retailers, resellers, distributors) typically have a need for detailed product information (e.g., specifications, OEM marketing descriptions, product images, product search, product comparison, product configuration, and identification/configuration of product accessories and related products) to support interactions with consumers. In addition to product information, other information, such as promotional information (e.g., rebates, coupons, and sweepstakes) can be included with the product information or sent in response to a separate query.

Figure 1:
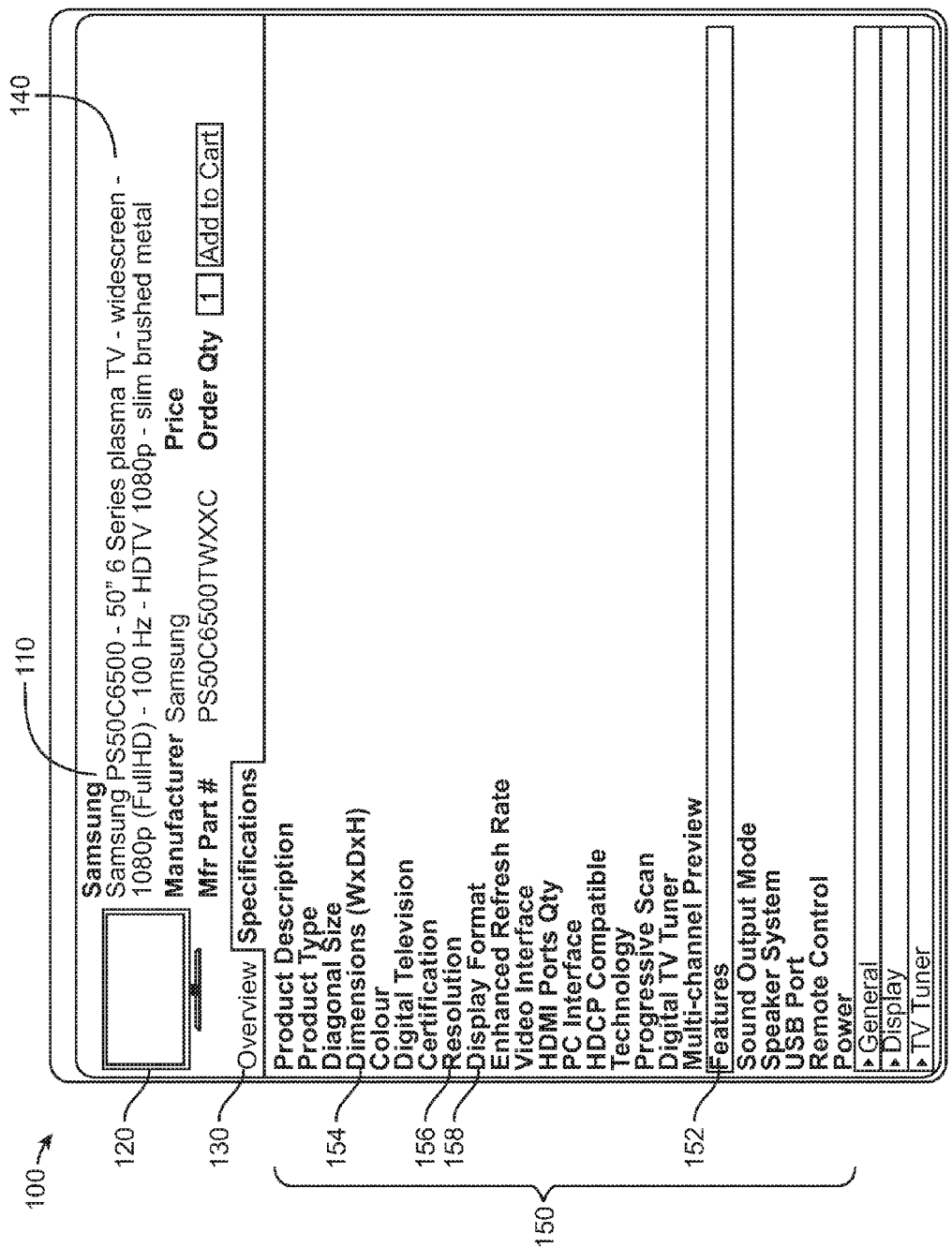
FIG. 1 illustrates a prior art storefront providing product information on a generic webpage.

FIG. 1 illustrates how an electronic storefront providing product information may be presented via HTML code using a generic template 100 on a typical webpage. The example format includes: a title 110; a product image 120; a short description or overview 130 of the product; a marketing description (typically from the product OEM) 140; and a main product specification 150, which includes features 152, dimensions 154, resolution 156, and display format 158, which can be uniformly associated with consumer (CE) products. Other common product information is illustrated by FIG. 1, but is not listed here for brevity.

The product information of FIG. 1 may be retrieved from a local or cloud-based database. In this example, the data is formatted using code integrated in the webpage. Providing custom code to retrieve and format data on a website can be time consuming, error-prone, and costly. Each user of the database provides custom code to retrieve and format the displayed product information, which results in duplication of work and increased costs. Furthermore, since there is little or no standardization for product information across the broad range of OEMs, retailers, and resellers, obtaining accurate information sufficient to support such consumer interactions can be resource-intensive and difficult to achieve.

Embodiments set forth herein may be used with services that collect product information from multiple sources, normalize the collected product information in a standard format, store the normalized product information in a structured data repository, such as a product information database, and provide an interface for clients such as e-commerce sellers. In other words, embodiments may operate to facilitate a vendor in obtaining normalized product information to support interactions with consumers, both by normalizing product information and/or accessing normalized product information from external sources. The CNET® Content Solutions DataSource™ product information service is an example of such a normalized information system. CNET® and DataSource™ are trademarks or registered trademarks of CBS Interactive Inc. The CNET® Content Solutions DataSource™ system provides normalized information on consumer electronics that can be used by online retailers such as Best Buy®. Best Buy® is a registered trademark of BBY Solutions, Inc. A client (e.g., an e-commerce seller) may provide product identification data (e.g., product title, product OEM, product OEM part number) as input to such product information services. As an initial task to providing normalized product information, requests may be mapped to appropriate entries in the stored normalized product information, for example, product information databases and indexes thereof.

Embodiments may also present normalized product information in a widget instead of providing custom code to format the product information. In a non-limiting example, the widget may be generated by the host of the product information, and integrated into any webpage, thereby obviating the need for the e-commerce vendor to format the product information. Therefore, each e-commerce vendor that uses the product information service may simply integrate the widget into their website without the need to generate custom code to retrieve and format product information.

Integration of a widget into a website does not generally require backend server integration. For example, a JavaScript® hook may be placed on a webpage. An exemplary JavaScript® widget may be a script tag that takes parameters and returns JavaScript® that dynamically adds content to a web page. For example, a website developer may put a snippet of code, such as the following, to generate a widget for his webpage:

```
<script type="text/javascript" language="javascript" src="finder/finder.nocache.js?
account=demo-ja&finderType=tv&hostName=stage-finders.cnetcontentsolutions.com&
protocol=http&port=80&container=ccFinderDiv"></script>
```

Figure 2:
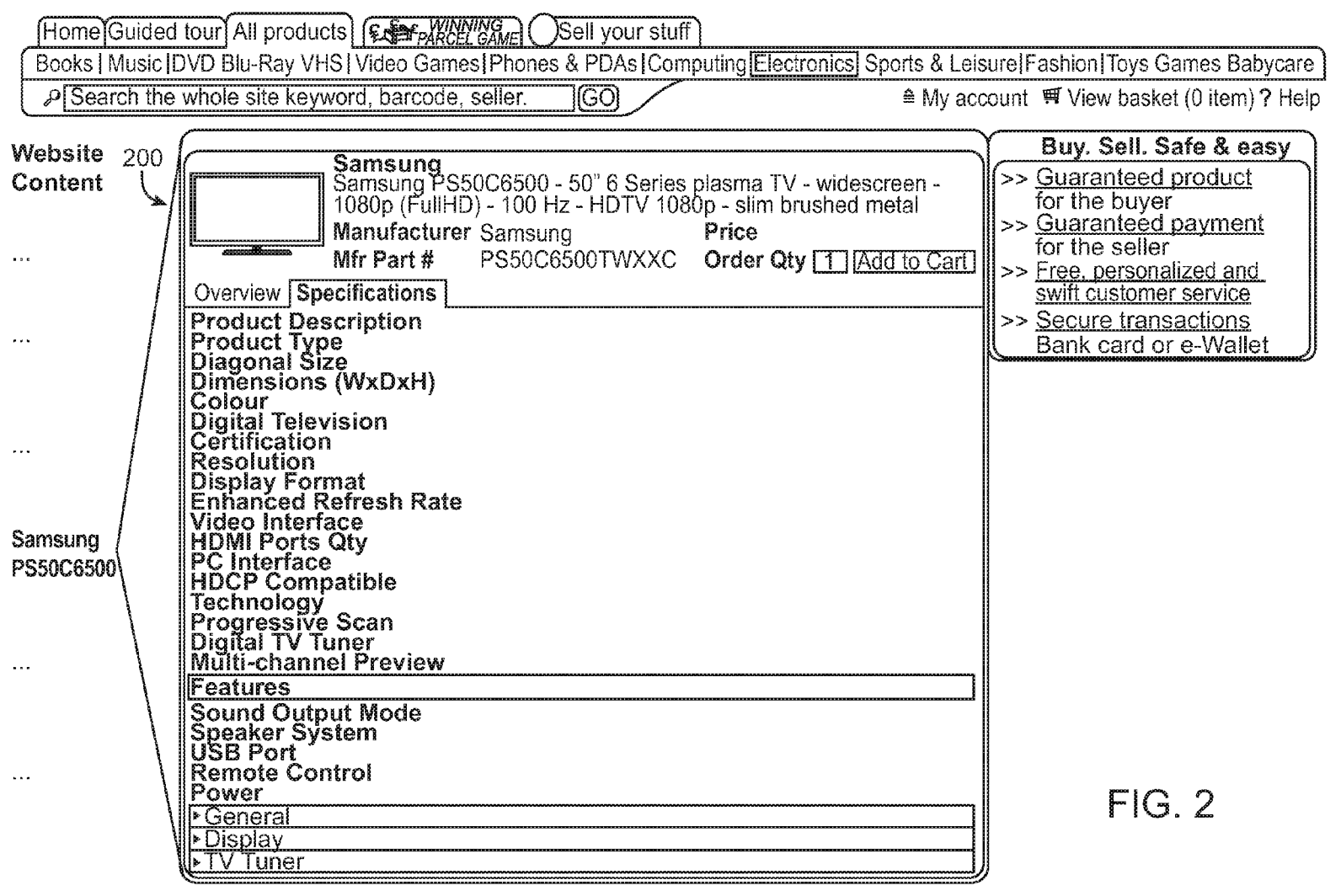

FIG. 2 illustrates the product information of FIG. 1, but with the product information presented in widget 200 configured according to embodiments, instead of being rendered directly by the source code of the webpage. The information displayed on the webpage may be similar, if not identical, to the information in generic template 100 of FIG. 1; however, using a widget 200 instead provides advantages as enumerated herein. For example, instead of using generic template 100, a more seamless and cost-effective presentation may be affected by the widget 200 that does not require complete web-site customization.

FIG. 3 shows an exemplary embodiment including a product and/or user reviews widget on a website. Webpage 300 includes widget 301, which may include a preconfigured template for displaying information in a customized fashion.

The preconfigured template for widget 301 may be configured by the vendor of the product identification data based on instructions from a client (e.g., website owner). In this manner, widget 301 may present information in a seamless fashion such that the product identification information has an integrated look and feel as to not appear generic, which can give webpage 300 a professional appearance. Much of the same information displayed in widget 200 may also be displayed in widget 301 of FIG. 3, albeit the information may be displayed differently. The widget 301 may present product information such as product reviews (e.g., by a third party reviewer) and/or user reviews (e.g., by consumers), as illustrated in FIG. 3.

Figure 4:
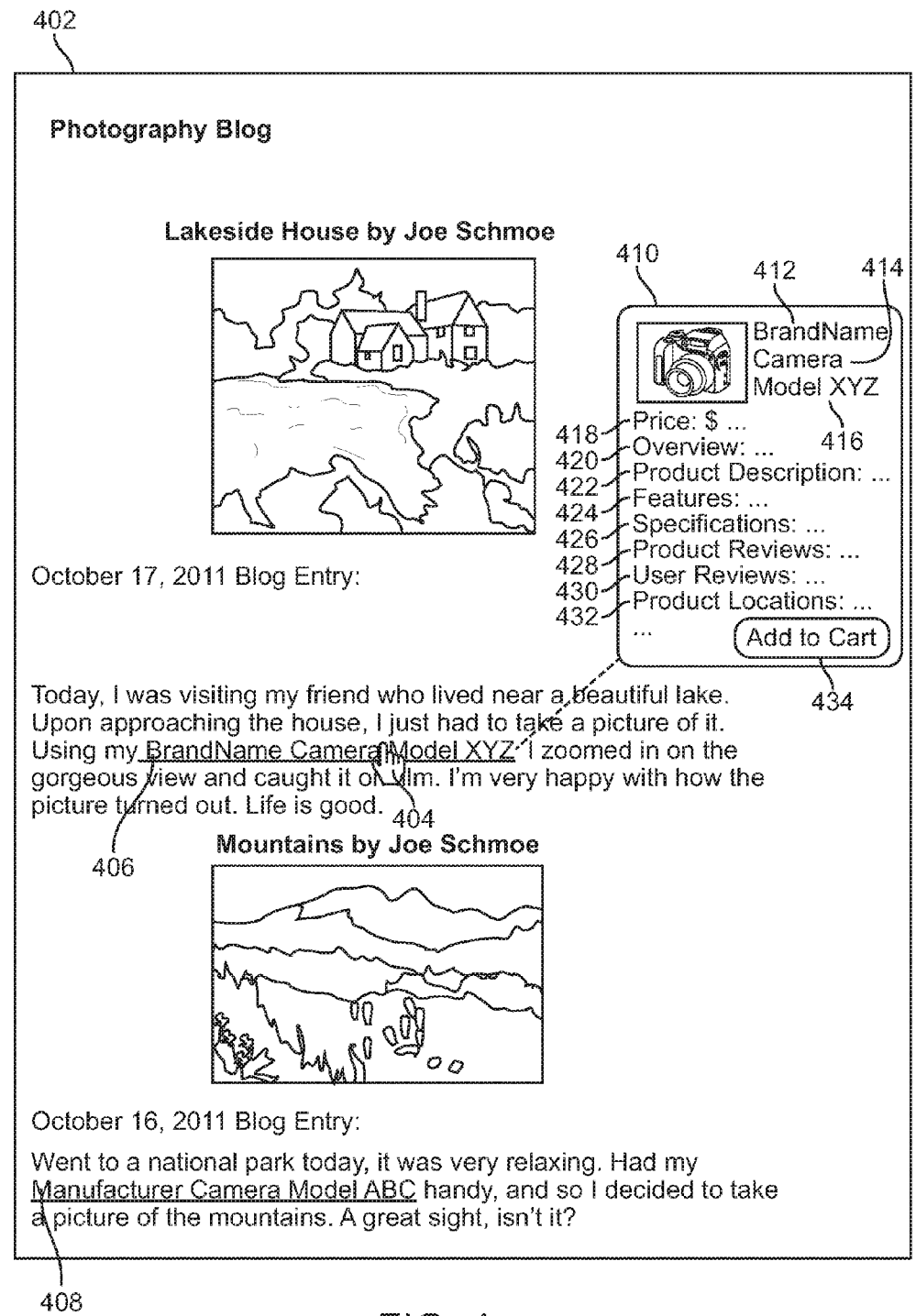
FIG. 4 illustrates an exemplary embodiment including a widget for providing a storefront and displaying product information.

FIG. 4 illustrates an exemplary embodiment including a widget for providing an electronic storefront and displaying product information. A website developer may access a snippet of computer code, such as JavaScript®, to generate a widget on the developer's website, as illustrated in FIG. 4. A user or viewer of the website (e.g., potential consumer) may browse the website 402 and place or move a mouse pointer 404 over a product 406. When the mouse pointer 404 is placing over a product 406 (e.g., during a mouse rollover), a widget 410 may automatically be displayed to the user. The widget 410 may communicate with one or more remote databases to retrieve and display various information and data about the product, such as the brand name 412 (i.e., manufacturer), the product name/type 414, the model 416, the price 418, an overview 420 of the product, a product description 422, features 424, technical specifications 426, product reviews 428 (e.g., reviews submitted by the website, a third party, a server hosting the remote database), user reviews 430, product availability and locations 432, and other information.

As shown in FIG. 4, the widget 410 may provide buttons 434 for interacting with the product, such as purchasing the product (e.g., "Add to Cart," "Buy Now," "Purchase," "Checkout" buttons). As such, the widget 410 may serve as an electronic storefront for the website. Furthermore, the widget 410 may provide additional information by including other widgets, including, but not limited to, a product data widget, a shopping cart widget, a purchase widget, and combinations thereof. An illustrative and non-restrictive example provides that the information and data relating to the product may be retrieved by the product data widget from a remote database/server, and the shopping cart and purchase widgets may communicate with the same or a different remote server (e.g., customer store service with retailer/prices catalog) to carry out shopping related tasks.

A widget 410 may be used with a product finder. The product finder may automatically find products (e.g., 406, 408) on a webpage. An anchor can be created for each of these products. Information about these products may then be retrieved from a remote database by the widget 410 to be displayed on the webpage to a viewer of the webpage. As the viewer places a mouse pointer over each product on the webpage, a widget may be displayed providing view information relating to the respective product as well as processes for purchasing the product. Thus, a widget may serve as an electronic storefront for any website, thereby obviating the need for the website to implement its own product database and/or electronic storefront.

Figure 5:
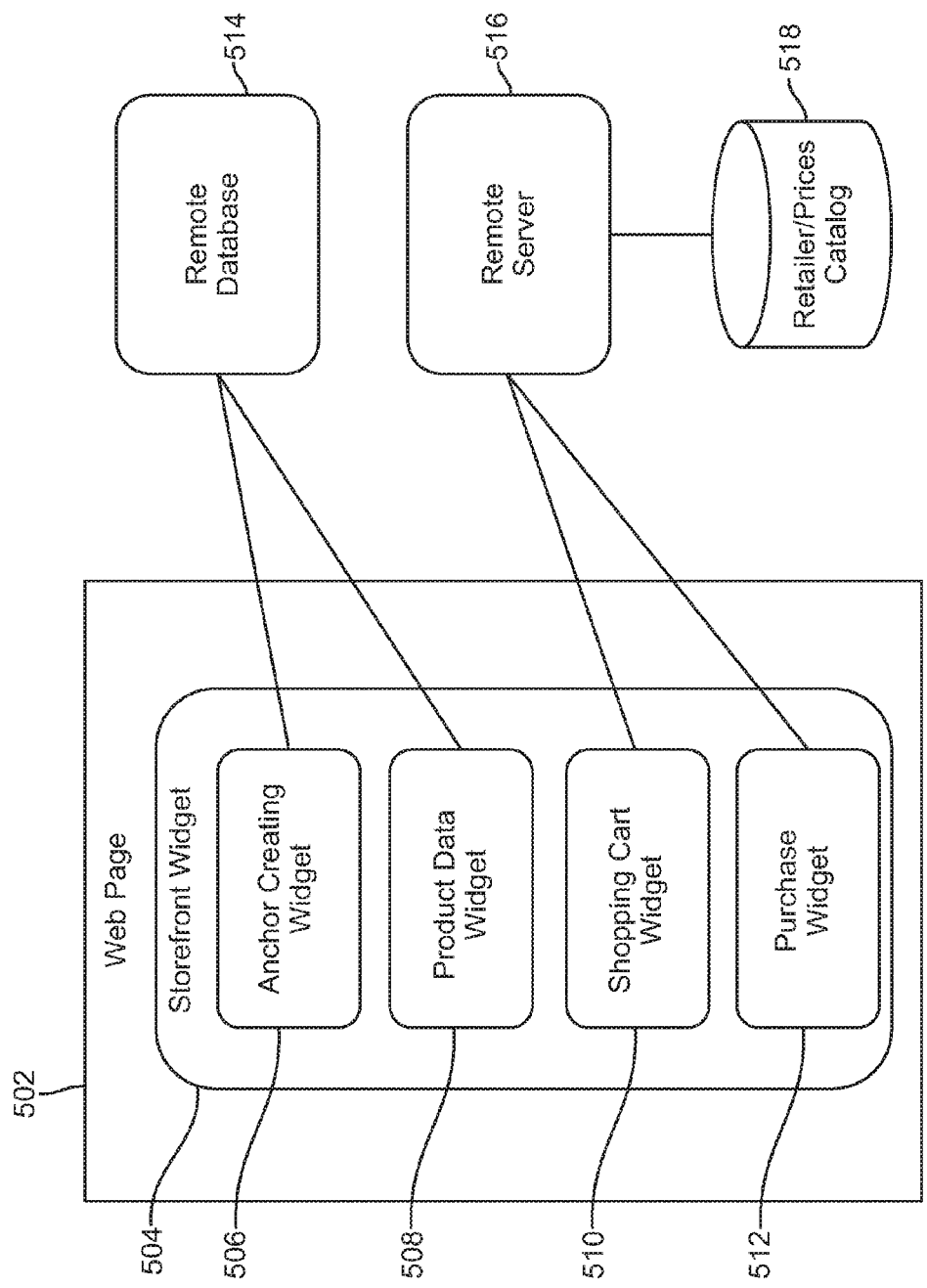
FIG. 5 illustrates an exemplary embodiment including a storefront widget communicating with a remote server(s)

Referring to FIG. 5, therein is provided an exemplary embodiment including a storefront widget communicating with a remote server. The storefront widget 504 may reside on a webpage 502 and may include other widgets (e.g., widgets within a widget). For example, the widget 504 may include another widget 506 to create an anchor for each product on the webpage (e.g., an anchor can be created from the website text naming the product). There may also be a widget 508 for accessing product data. These widgets 506 and 508 may communicate with a remote database 514 storing product data to carry out their tasks. Moreover, a shopping cart widget 510 and/or a purchase widget 512 may handle shopping tasks. These widgets 510 and 512 may communicate with a remote server 516, which may, for example, utilize a retail/price catalog 518 to serve retailer and pricing information. In one embodiment, information in the retail/price catalog 518 may be continually refreshed and re-indexed according to information stored in vendor databases used as a data source for the retail/price catalog 518. For example, if a vendor does not carry a particular product (e.g., plasma HDTVs), then that product and any associated features may be hidden on a storefront widget 504. The remote database 514 and remote server 516 may be separate (e.g., two separate servers), function together (e.g., one server), operate as a single entity or multiple separate entities, or some combination thereof. Although certain widgets 506, 508, 510, 512 have been illustrated in the exemplary embodiment shown in FIG. 5, embodiments are not so limited, as any widget capable of functioning within the storefront widget 504 is contemplated herein.

Figure 6:
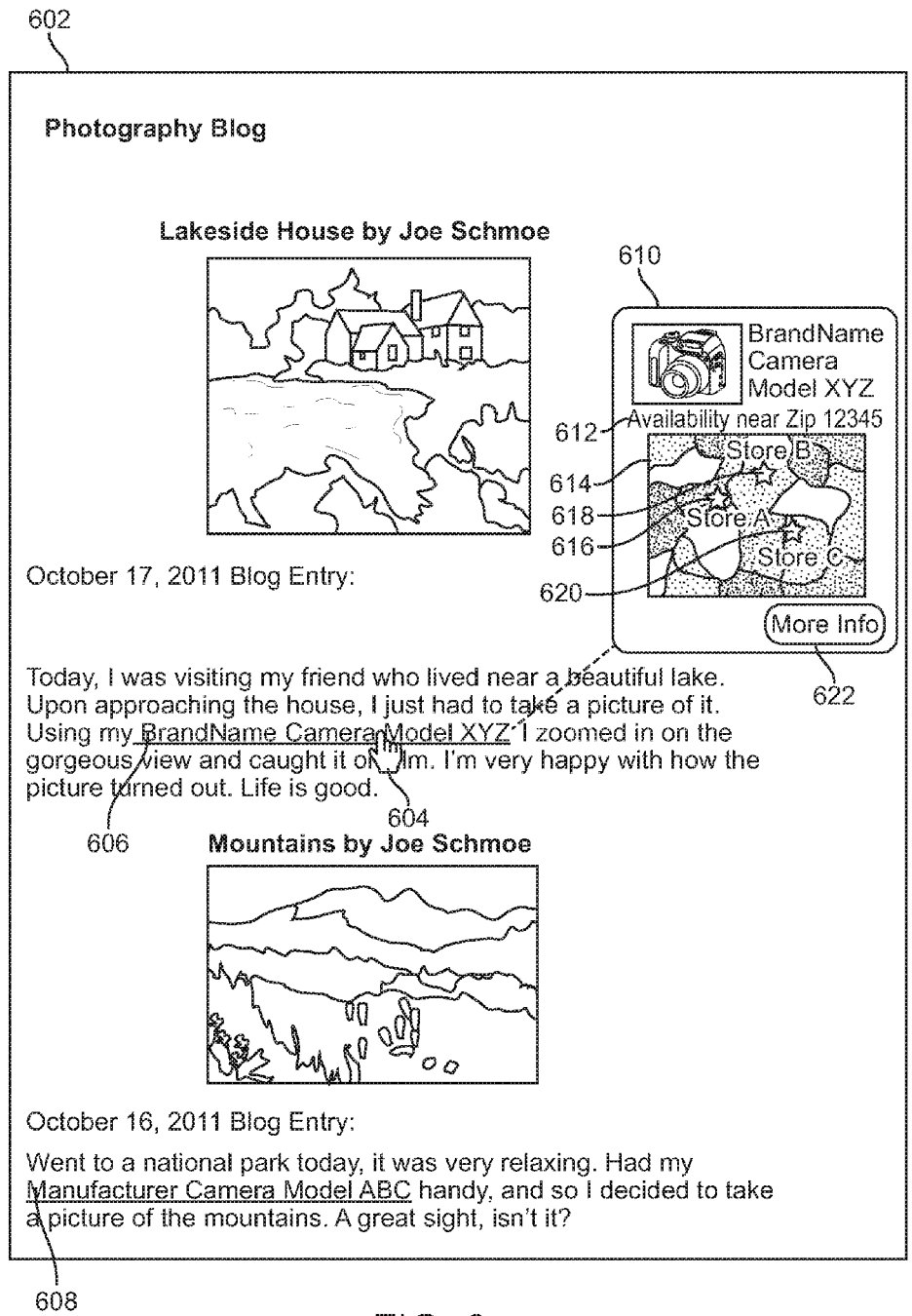
FIG. 6 illustrates an exemplary embodiment including a widget for providing a storefront and displaying product information encompassing product availability and locations.

According to embodiments, a widget 610 may be used with a mapping feature or other service providing product location and/or availability, as shown in the exemplary embodiment of FIG. 6. If a consumer (e.g., website viewer) wants to purchase the product in person at a physical location, or if the consumer wants to check out the product in person, the widget 610 may retrieve product availability and/or location information from a remote server to display such information to the consumer. For example, the widget 610 may request the consumer to input a zip code and/or address information 612, including partial address information (e.g., city and state). Based on the zip code or address input 612, the widget may communicate with the remote server and/or a mapping service to retrieve information regarding where the product is available near that zip code or address. The widget may display where the product can be found on a map 614 encompassing the zip code or address. The places where the product should be available may be marked (e.g., stores A, B, and C are marked with stars 616, 618, and 620, respectively). The widget may provide more information, for example, through buttons 622 configured to provide additional information, such as store hours, store addresses, directions, store contact information, and the like. For example, the widget may be a mash-up of an online store (i.e., store widget) and a mapping feature (i.e., map widget, mapping service).

Figure 7:
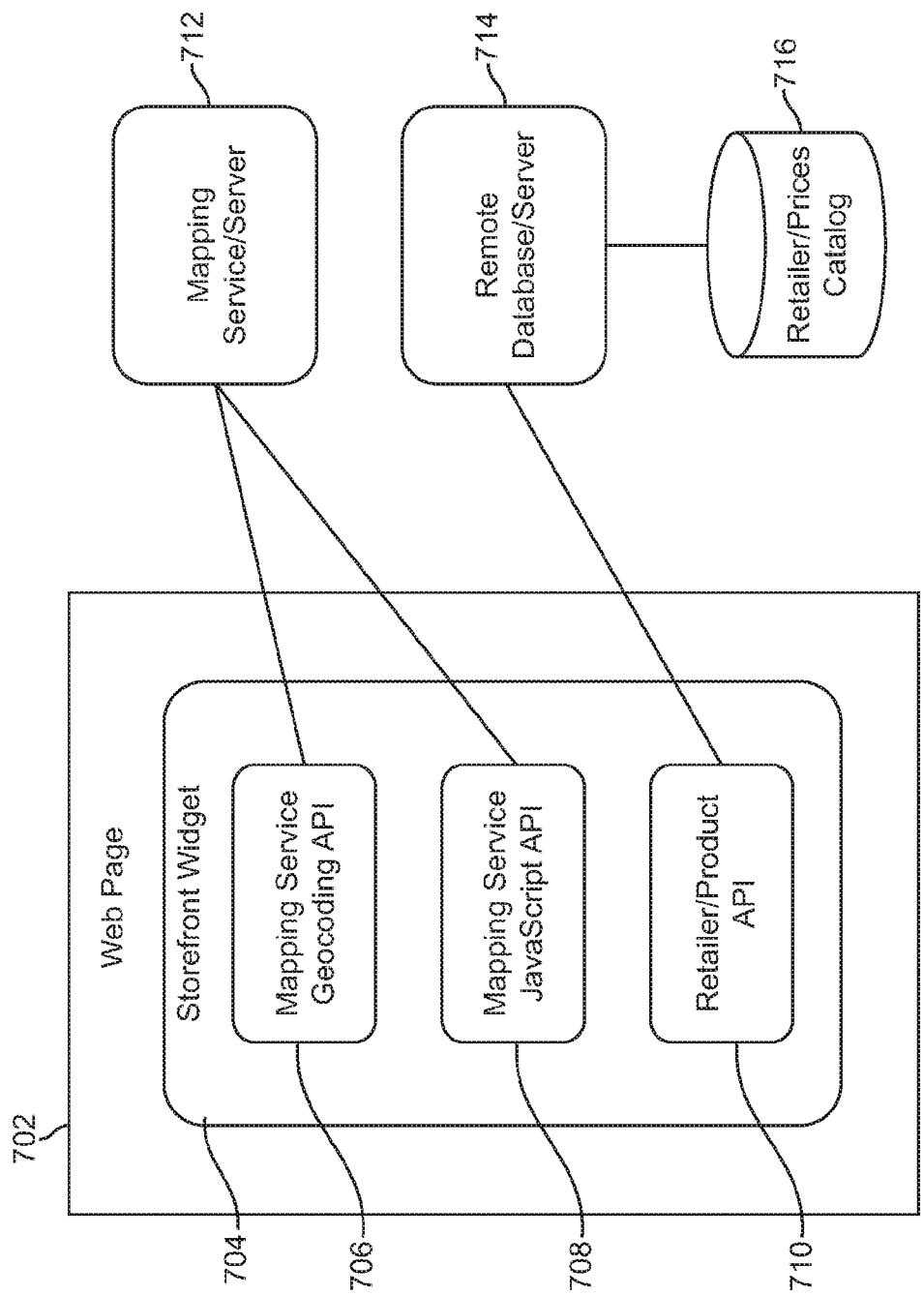
FIG. 7 illustrates an exemplary embodiment including a storefront widget communicating with a mapping feature.

Referring to FIG. 7, an exemplary embodiment including a storefront widget communicating with a mapping service is shown. The storefront widget 704 may reside on a webpage 702 and may include various components. For example, the widget 704 may include a mapping service geocoding Application Programming Interface (API) 706, which can be useful for finding the street address of a store. The widget may also include a mapping service JavaScript® API 708, which may be used to embed a map or mapping features within the storefront widget 704. These APIs 706, 708 may communicate with the mapping service 712 to carry out their mapping tasks. Moreover, the widget 704 may include a retailer/product API 710, which may be useful for retrieving retailer and/or product information from a remote database/server 714. The remote server 714 may communicate with a retailer/prices catalog 716 for retailer and/or pricing information. The mapping service 712, remote database 714, and catalog 716 may be hosted on a single entity (e.g., one remote server) or on separate entities (e.g., multiple remote servers).

Figure 8:
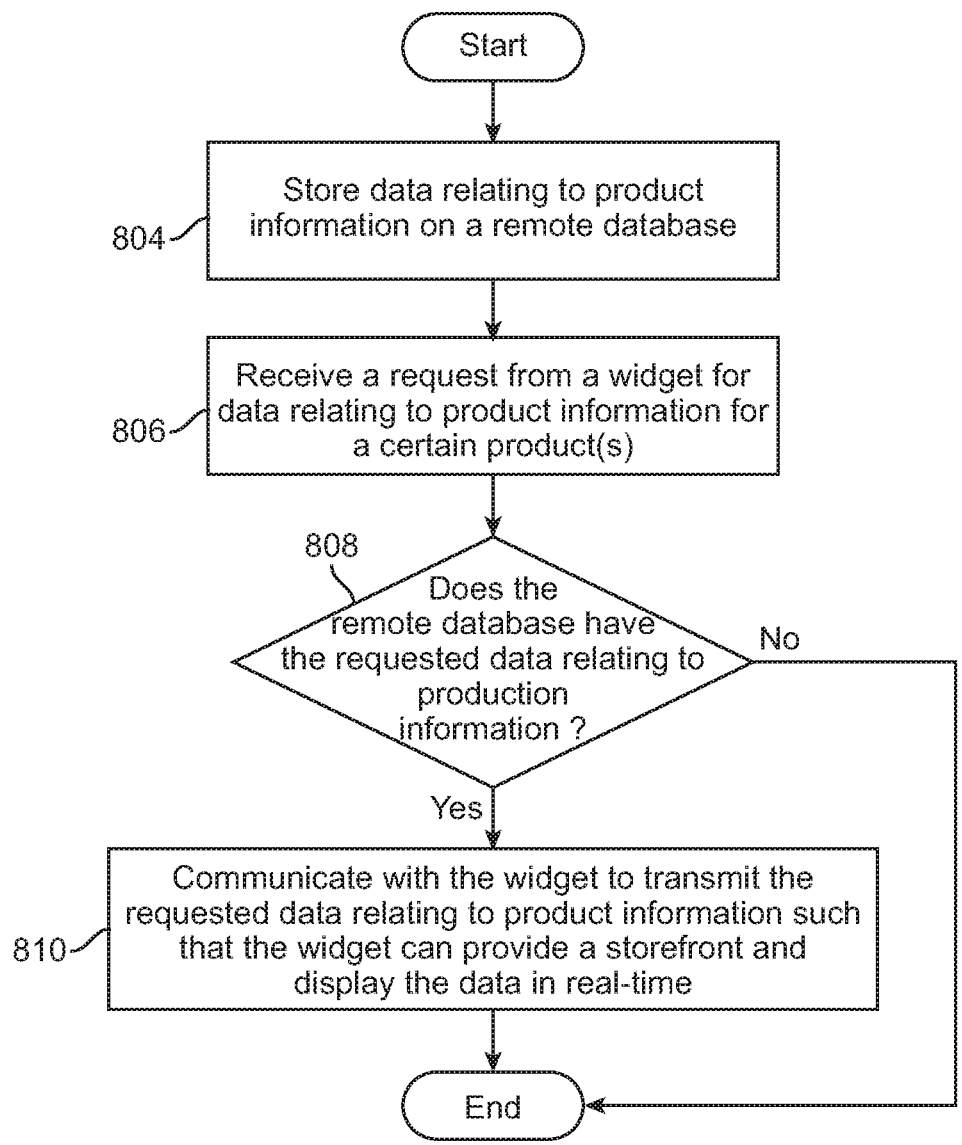
FIG. 8 illustrates an exemplary method embodiment for facilitating a widget to provide a storefront on a website to display product information in real-time.

FIG. 8 illustrates an exemplary method embodiment for facilitating a widget to provide a storefront on a website with product information for display in substantially real-time. The method embodiment includes storing data relating to product information on a remote database 804. For example, a remote server may host a database that stores normalized product information, such as consumer electronic product data, manufacturer marketing content, and parametrically searchable product specifications. A remote server/database may receive a request from a widget on a website for data relating to product information for a certain product(s) 806. The remote server/database may check whether it has the requested data 808. If the remote server/database does not have the requested data 808, the method may terminate. Otherwise, if the remote server/database has the requested data 808, the remote server/database may communicate with the widget to transmit the requested data relating to product information such that the widget may, in substantially real-time, provide a storefront and display the data 810.

Figure 9:
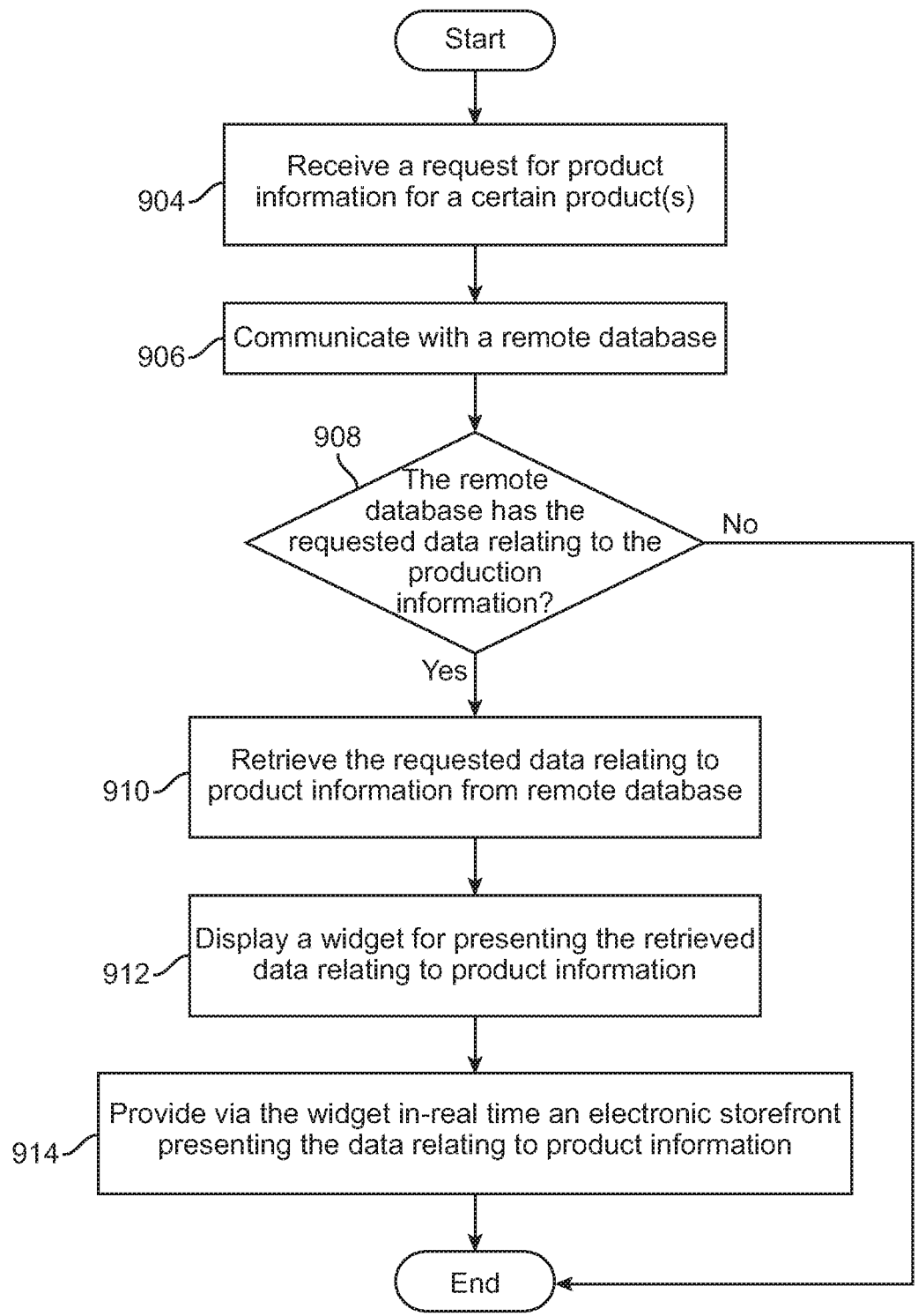
FIG. 9 illustrates an exemplary method embodiment for providing a storefront on a website to display product information in real-time via a widget.

FIG. 9 illustrates an exemplary method embodiment for providing a storefront on a website displaying product information in substantially real-time via a widget. The exemplary method embodiment includes receiving a request for product information for a certain product(s) 904, such as a website (or a widget on a website) receiving a request for product information for a certain product. For example, a visitor of a webpage may seek access to product information for a certain product and, accordingly, may place a mouse pointer over the product name on the webpage. As such, the request to access data relating to product information may be received by the webpage (or widget on the webpage). The widget may be configured to communicate with a remote database 906 in an attempt to retrieve the requested information. If the remote database does not have the requested data 908, the method may end; otherwise, if the remote database has the requested data 908, then the widget may retrieve the data for display 910. The widget and the retrieved data may be displayed in substantially real-time 912. The widget may present an electronic storefront displaying the retrieved data and/or a button(s) providing convenient shopping functions (e.g., "Add to Wish list," "Buy," "Checkout") 914.

Figure 10:
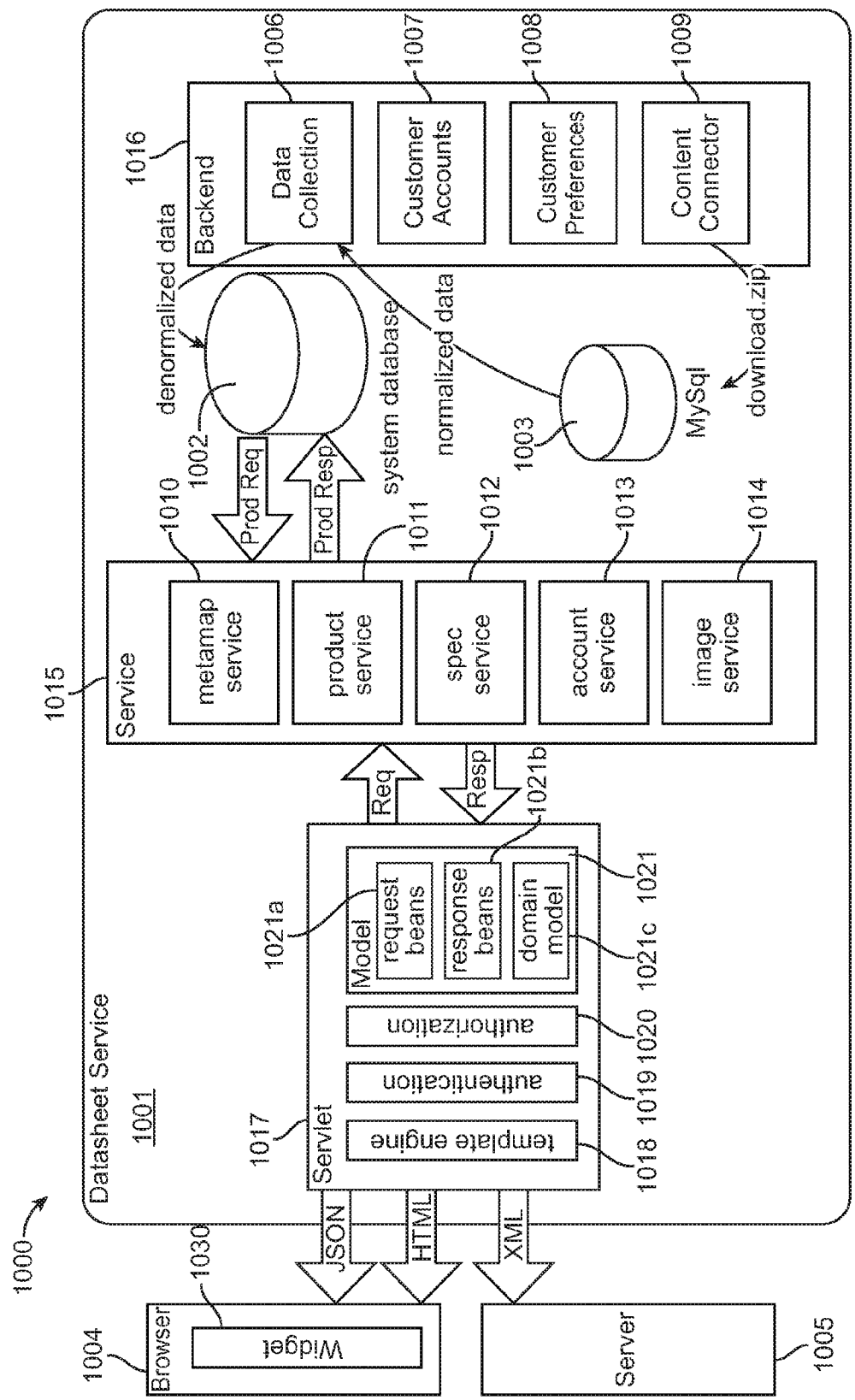
FIG. 10 illustrates an exemplary system embodiment for serving product information to a web server.

FIG. 10 illustrates an exemplary system embodiment for serving product information to a web server. FIG. 10 shows a system 1000 comprising a server 1005, which may host an e-commerce website. On the backend 1016, there may be a data collection function 1006, customer accounts 1007, customer preferences 1008, and content connector 1009. Content connector 1009 may normalize product information received from vendors (e.g., as a file, such as download.zip) and may export the normalized product information into a database, such as a MySQL database 1003. A data collection function 1006 may be used to denormalize data, for example, by storing the information in a custom fashion, from the MySQL database 1003, and storing the data in a system database 1002. Customer accounts 1007 may store customer information such as addresses, payment histories, and subscription levels as well as a set of attributes for configuring a widget 1030. According to embodiments, the set of attributes may include information pertaining to headers, footers, cascading style sheets (CSS), width, categories, questions, buttons, and inclusion or exclusion of content (e.g., buyer guide). Customer preferences 1008 may store certain customer preference information, such as which product information to send when a query is received or information pertaining to how the data should be presented. The customer preferences 1008 may be configured when the customer sets up an account with datasheet service 1001.

A datasheet service 1001 may include a group of services 1015 for interfacing the backend 1016 with the servlet 1017. For example, FIG. 10 illustrates a metamap service 1010, which may map product identifiers received from server 1005 with product information stored in system database 1002 and MySQL database 1003. Product service 1011 may deliver basic product information such as brief product descriptions. Spec service 1012 (i.e., specifications service) may deliver detailed product specifications. Account service 1013 may give an e-commerce website administrator access to their datasheet service account tracked in customer accounts 1007. Image service 1014 may provide an image associated with the product identifier, for example, as received from either a browser 1004 or a web server 1005.

Servlet 1017, as illustrated in FIG. 10, may be implemented, for example, in Java™ to provide a request-response interface with, on one side, browser 1004 and web server 1005, and on the other side, services 1015. Servlet 1017 may include a template engine 1018, authentication module 1019, authorization module 1020, and model 1021. Template engine 1018 may format product information into one or more website development languages, including, but not limited to, extensible markup language (XML), hypertext markup language (HTML), such as HTML 5, or JavaScript® object notation (JSON) templates, for insertion into a widget in browser 1004. Authentication module 1019 may authenticate server 1005 to determine whether the server 1005 is bona fide by, for example, using a security certificate or secure token passed along with a request for product information. Authorization module 1020 may determine whether server 1005 has access to particular features of datasheet service 1001 as allowed per a contract between the hosted datasheets provider and the administrator of server 1005. Authorization module 1019 may include access to several services such as the following: a base product service that may include a basic product title and summary; a product images service that may include one or more images of the product; a product spec service that may include detailed product features and specifications; and a related products service that may suggest complementary or similar products with slightly different features or prices.

These different services may be offered in different combinations depending on the needs and cost considerations of each particular e-commerce website. In addition, the base product service may be broken up into different catalogs, for example, based on product type (e.g., laptops, cameras, TVs). Breaking out products into catalogs may allow further diversity of prices and for more e-commerce websites to tailor their use of hosted datasheets service 1001 to their particular needs. In addition, servlet 1017 may include model 1021, which may include objects in a domain model 1021c, along with JavaBeans™, which are generally reusable software components for Java™. Java™ and JavaBeans™ are trademarks or registered trademarks of Sun Microsystems, Inc. Model 1021 may utilize JavaBeans™, for example, to provide requests and/or accept responses (e.g., request beans 1021a, response beans 1021b).

Datasheet service 1001 may be customized to one or more particular needs of an e-commerce website. Different levels of service may be established in customer accounts 1007, as discussed above. In addition, preferences may be set in, for example, customer preferences 1008. Preferences may include customization, such as color and formatting customizations, of the template used by a template engine 1018, number of pages in a template, an overview, specifications, accessories, product and/or customer reviews, and learning features (e.g., glossaries, guides, and manuals). Customizations may be established by an e-commerce website when an account is established, which can be done over the Internet or over the phone.

Queries may be formed using any database or programming language. The following example illustrates a query using JavaScript®:

```
<script src="http://hosteddatasheets.com/datasheet?h=CUSTID&view= html&mf
=MANUFACTURER&pn=PROCUCT_ID&locale=LOCALE_CODE&acc=yes"type="
text/javascript" defer="defer" async="true"></script>
```

In one example of a transaction between browser 1004, server 1005 and datasheet service 1001, browser 1004 may access a website hosted by server 1005. Browser 1004 may send a query to server 1005 for a product, such as a TV. The server 1005 may identify a group of TVs matching the query. Each identified TV may have an associated product identifier, or may be identified by metadata, which the widget 1030 may use, inter alia, to generate queries to datasheet service 1001. The queries may include parameters stating information needed to respond to the query. Only limited information, such as name, picture, and screen size, may be needed, for example, because a list of TVs will be sent to browser 1004, which has limited area to display information. Moreover, the user of browser 1004 might only want limited information on each product at this time because the user may seek to quickly review several TVs to find one for further inspection. However, more or less information may be provided. Queries from widget 1030 may be received by servlet 1017, which may authenticate server 1005, and determine what level of service the server 1005 is authorized to access. The query may be further processed by request beans 1021a to generate a request to services 1015. Services 1015 may then query a database, which in the example of FIG. 10, is system database 1002. Product information in system database 1002 may be formatted according to specifications configured in backend 1016. If the requested data is not yet in system database 1002, it may be retrieved from MySQL database 1003, and denormalized by data collection module 1006, before being stored into system database 1002 and returned to services 1015. Services 1015 may return a response bean to model 1021. Finally, template engine 1018 may format product information received from the response bean into an XML, HTML or JSON widget, which may be sent to server 1005 and forwarded to browser 1004, or the product information may be sent directly to browser 1004 for display in a widget 1030. As such, the widget 1030 may present the product information and provide an electronic storefront in real-time.

Utilizing the embodiments described herein, and exemplified in FIG. 10, e-commerce sellers may have access to a very complete database of product information that would otherwise be cost prohibitive to build and maintain. Embodiments may also provide maintenance and updating of the product information database, seamless integration into e-commerce websites such that the product information appears to be coming from the e-commerce seller's own website. Also, services may be added or removed as required by specific e-commerce seller's needs, thereby allowing for separate service levels.

Other embodiments may include collecting user reviews and storing them into a database, such as a MySQL database 1003. Social media information about a person's social circle may be gathered from social media networks. The social media information may be used to determine whether friends of the person have reviewed or commented on a product; reviews from friends may be more prominently displayed in customer reviews because they may be more relevant.

The query uses the HTML <script> tag, and the 'src' parameter defines a query that, in this example, is sent to an exemplary data sheet hosting web site (i.e., http://hosteddatasheets.com). The query above has several parameters, including the h, view, mf, pn, locale, and acc parameters. Among these parameters, there may be a "type" parameter, which allows a query to identify the type of product information that is requested (e.g., image or datasheet).

Products may include CE products, such as televisions (TVs) (e.g., high definition TVs (HDTVs)), DVD players, cell phones (e.g., smartphones), computing devices (e.g., laptops, personal computers (PCs), tablet computing devices), cameras, audio recording and playing devices, and the like. Products may additionally include media products such as music, movies, books, and TV shows. For example, a widget may be displayed on a webpage where media is mentioned (e.g., a blogger on a blog site may publish content about his favorite book, a person on a social networking site may post a movie title, or a web user may update a status message to reflect a song he is listening to at the moment). As such, a widget may be displayed for various media products as a person browsing these sites (i.e., potential consumer) places a mouse pointer over them. The widgets may be configured to provide the full product name (e.g., title), author, director, producer, editor, cast, a sample media clip, excerpt, or abstract, price, and other information about the media product. In addition, widgets may provide clickable button(s) for interacting with the product (e.g., shopping functions such as "Purchase," "Bid," "Add to cart," "Process").

A webpage may display a video containing one or more products. A widget may be displayed to a visitor of a webpage to provide information and data relating to the one or more products in the video. For example, if the video has been tagged with one or more keywords, such as "Brand Name Camera Model XYZ," then the widget may be made available to the visitor to display product information about the camera (e.g., when the visitor moves a mouse pointer over the product shown in the video, when the visitor moves a mouse pointer over the video tag/keyword). Similarly, if the video properties state which camera was used to record the video, then the widget may also display product information about the camera to the visitor. In addition, if the video description mentions the camera, the widget may display product information about that particular camera.

A webpage may present audio mentioning products. A widget may be displayed to a visitor of the webpage to provide information and data relating to the products mentioned in the audio. For example, if the audio has been tagged with one or more keywords, such as "Brand Name Microphone Model XYZ," then the widget may be made available to the visitor to display product information about the microphone. Similarly, if the audio properties or description mentions the microphone, then the widget may also display product information about the microphone to the visitor. In addition, speech-to-text software may be used to decipher the audio into text. If the audio and/or text mention the microphone, the widget may display information about it.

A webpage may present an image depicting one or more products. For example, the image may have a description or tags describing or associated with the one or more products. Any products mentioned may be provided by a storefront widget. A person's face displayed in an image provided on the webpage can be deciphered using facial recognition software. The person can be an author, singer, actor, or athlete associated with one or more products, including media products. Media and other products associated with the person may be provided by the widget. Similarly, any other products recognized in the image may additionally be provided by the widget.

A webpage may present or link to a game. In the game, there can be any number of real or virtual products. For example, in a Role Playing Game (RPG), a real or virtual item may be presented as a product via a widget, or, in a racing game, a car within the game may be presented as a product via a widget. Moreover, the game may utilize real or virtual currency for shopping. As such, a widget may provide a storefront for using real and/or virtual currency.

A webpage may present a restaurant or other business, such as a retail business. A widget on the webpage may provide meal vouchers, coupons, tickets, or any other merchandise/products mentioned or associated with the restaurant or other business.

A widget may be comprised of a JavaScript® hook, such as a script element. A widget may be generated from computer code including JavaScript®, jQuery, HTML, HTML5, or any combination of these and/or other programming languages.

A widget may disappear when the mouse pointer is no longer placing over the product (e.g., over the predefined webpage area representing the product) and/or there may be a "Close" button to close the widget.

A remote database may be hosted on a remote server. The remote database and remote server may be separate or completely or partially integrated. A web server may be a server on which a website is hosted. A web server may be a server connected to the World Wide Web (e.g., the Internet). The system database may implement a database management system, such as an Apache Cassandra™ database management system. Apache Cassandra™ is a trademark of the Apache Software Foundation.

A remote server may aggregate data, such as data collected from a website (or a widget on a website). For example, as a webpage visitor places a mouse pointer over a product, data in the form of a request may be transmitted to a remote server. The fact that a visitor is placing a mouse pointer over a certain product may be useful data for research, statistics, marketing, sales, and other purposes. In addition, if the visitor decides to purchase a product, the fact that the visitor made the purchase may be useful data as well. For example, the remote server may aggregate data to determine and/or predict which products will likely be of interest to which potential consumers.

The data aggregation may be "passive" with respect to the website, widget on the website, or visitor of the website, in that there need not be any extra processing for the website in order to transmit the data. For example, if a webpage visitor is already placing a mouse pointer over a product or has already initiated a function associated with the product (e.g. purchase, bid, add to cart, etc.), then the remote server may receive one or more requests, such as a request for product information or a request to process the order. Since the remote server will receive these requests anyway, it can collect data about these requests, whereas the webpage, widget, or visitor need not incur additional processing. As mentioned above, the collected data can be useful for multiple purposes, including research, statistics, marketing, and sales.

Figure 11:
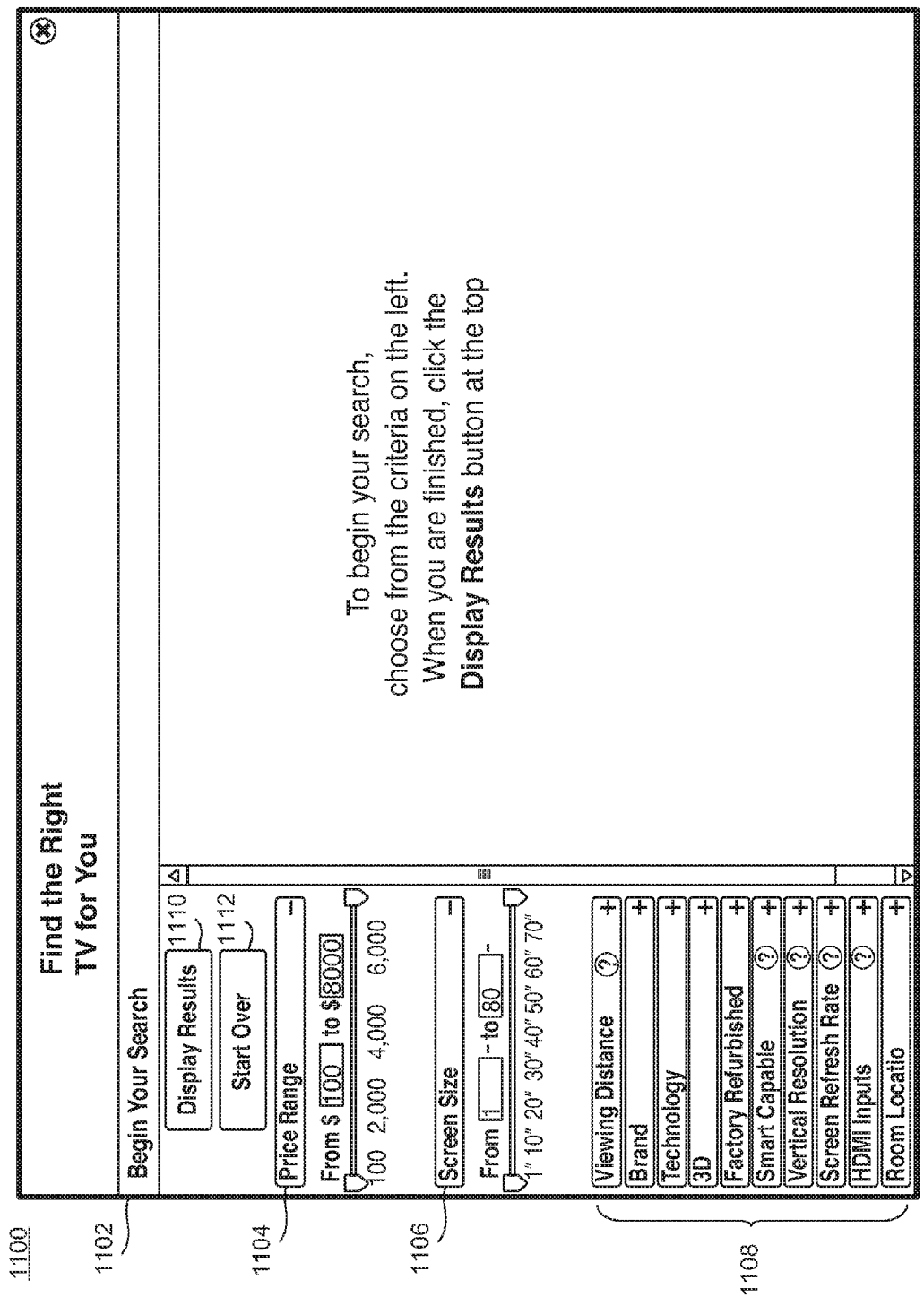
FIG. 11 illustrates an exemplary product finder configured to provide product information based on a search query.

FIG. 11 illustrates an exemplary product finder configured to provide product information based on a search query according to an embodiment. As shown in FIG. 11, the product finder 1102 may be configured to find televisions; however embodiments are not so limited, as the product finder 1102 may be configured to find any type of product, including but not limited to CEs, airfare, hotel rooms, automobiles, books, software, restaurants, and so forth. The product finder widget may change the set of attributes displayed and/or the range of possible attributes based on the product type. For example, the product finder widget may query a database on a server hosting the product finder widget, a database residing on a server hosting the product finder builder, or some other repository to determine the attributes. Alternatively, the product finder builder may statically incorporate the set of attributes within the product finder widget for a particular product category or customer. The product finder 1102 may be implemented on a generic webpage 1100 as shown in FIG. 11. The product finder 1102 may allow an end user of the product finder (e.g., a customer or a webpage visitor) to select a price range 1104 for one or more televisions of interest. There may also be a selectable range for screen size 1106. In addition, there may be many other product information details 1108 available for selection by a user. In response to the user selection of the product information details 1108, the product finder 1102 may find and provide only those products that match the user's selections. At any time, the user may clear all selections and start over (e.g., via a "Start Over" button 1110). To perform a search, the user may input selection(s), execute the search and retrieve (e.g., via the "Display Results" button 1112) those televisions that match the search query (i.e., search criteria as indicated by user selection(s)).

Figure 12:
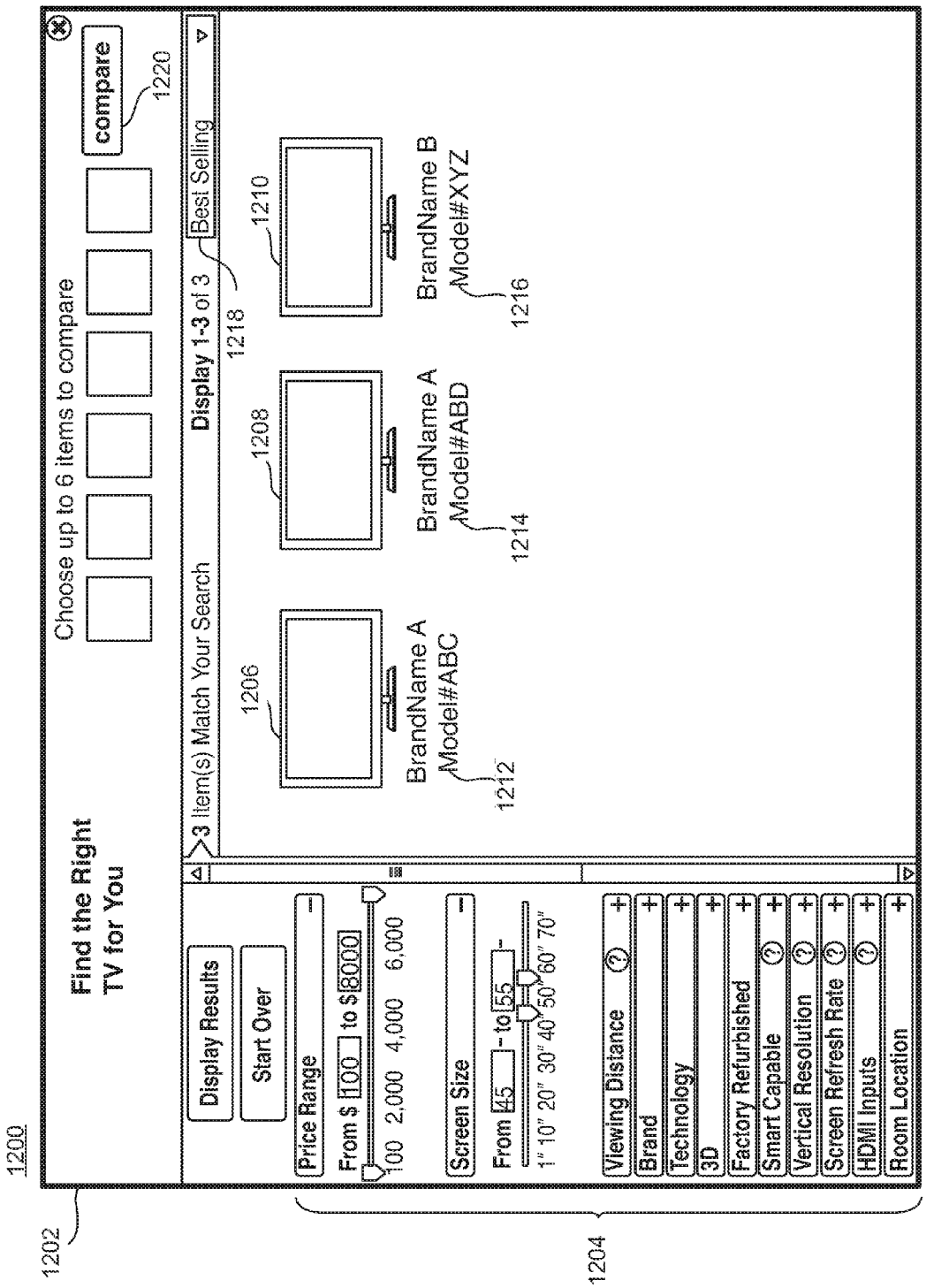
FIG. 12 illustrates an exemplary product finder providing product information resulting from a search query.

FIG. 12 illustrates an exemplary product finder providing product information resulting from a search query. The product finder 1202 may be hosted on a generic website 1200. The product finder 1202 may display product(s) 1206, 1208, 1210 and the respective product information 1212, 1214, 1216 resulting from a user's selection input 1204. A sorting function 1218 may sort products based on certain criteria, such as popularity, price, ratings, and the like. The user may also choose to compare (e.g., via a "Compare" button 1220) a number of products and product information resulting from the query.

The product finder may display general product attributes and properties before allowing the end user to navigate to more specific product attributes. The product finder may provide interactive buttons (e.g., sliding buttons to define range, hyperlinks) to allow the end user to selectively find products of interest. The product finder may have a genus-level specification sheet with active labels for specification values that allow narrowing from genus to species (e.g., narrowing to find a particular model).

For example, in the case of television products, the product finder may display to an online shopper a general specification page stating general attributes, such as "High Definition," "LCD," and "Plasma." These attributes may include hyperlinks such that when the end user clicks on them, more specific attributes may be displayed. For example, if the end user clicked on "High Definition," more specific attributes such as "720i," "720p," "1080i," and "1080p" may be displayed. Similarly, these more specific attributes may be hyperlinks and/or other interactive buttons and may lead to even more specific attributes, and so forth. Eventually, only those products that match the chosen attributes may be displayed to the end user. As such, the end user may filter through products from a general level of product characteristics down to a more narrow level, to ultimately find particular products of interest.

These example front-end user interfaces may be generated by a JavaScript® widget that may be easily copied and pasted into the existing code of a website. For example, an entity with in-depth knowledge of a wide variety of products may provide a JavaScript® widget that an e-commerce site operator may drop in place on their website. The JavaScript® widget, while only a very short snippet of code itself, may link to a much larger library of information and instructions maintained by the entity (or another third party) for generating the product finder, product builder, and so forth. In this way, the complexities of managing, configuring, and maintaining a database and user interface elements may be removed from the e-commerce site, and, instead, may be managed by a central party. This approach allows for many smaller e-commerce sites to enjoy the benefits of a robust, professional product builder or product finder while keeping overhead and website code complexity down. Essentially, the e-commerce site may abstract away the complexity of a highly functional electronic storefront through the JavaScript® widget.

A product finder builder may generate different JavaScript® product finder widgets based on received inputs. For example, the product finder builder may generate a product finder widget tailored for a particular customer and their site-specific, data-specific, or other specific requirements. The product finder builder may generate a widget of a specific size or range of dimensions to fit within the e-commerce site's layout, product set, price range, content filter, and so forth. The product finder builder may be a command-line utility, a software package with a graphical user interface, a web interface that receives inputs and generates corresponding JavaScript® widget code for copying and pasting into the code of an existing e-Commerce site, or any other suitable form.

Figure 13:
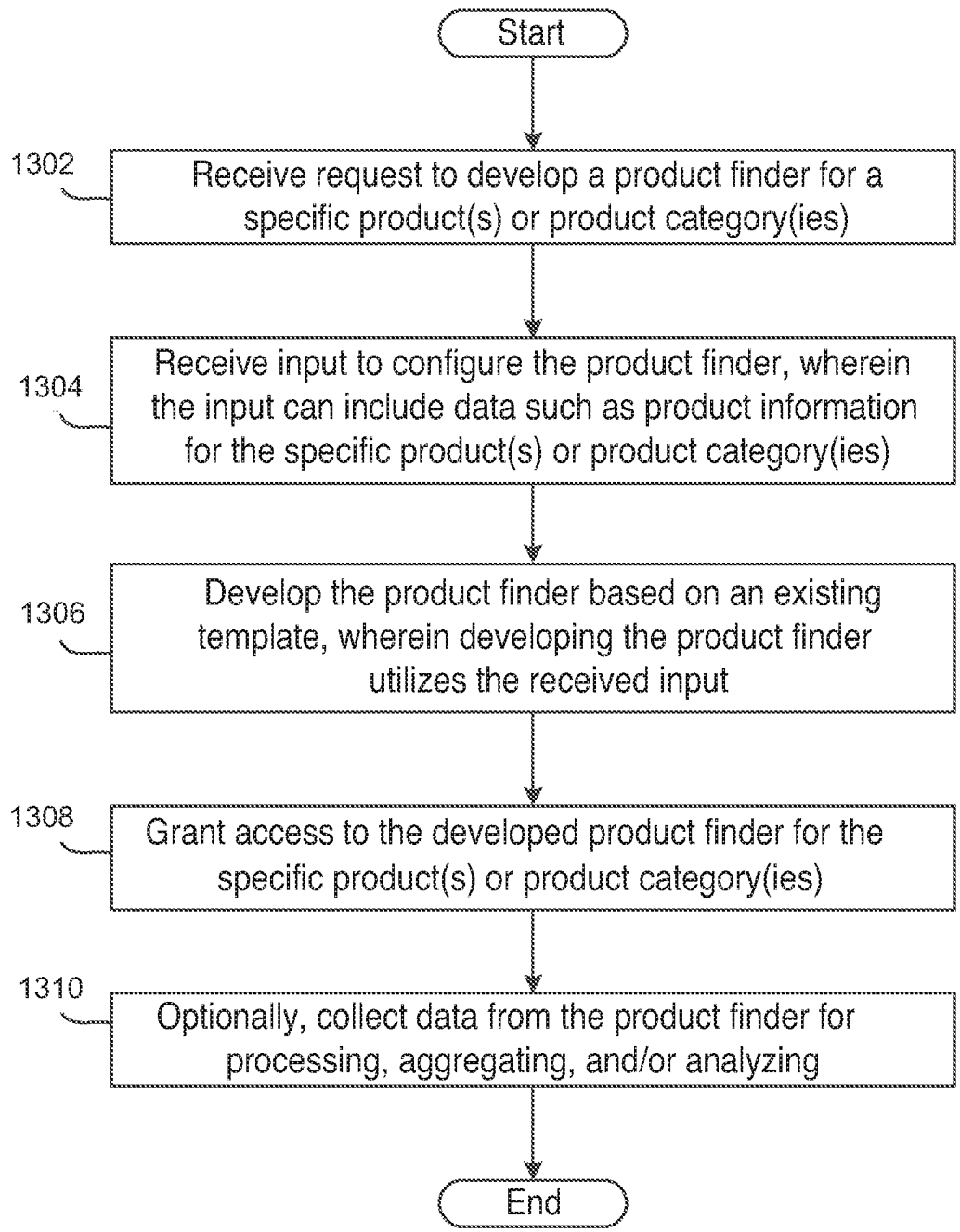
FIG. 13 illustrates an exemplary method embodiment for building a product finder.

FIG. 13 illustrates an exemplary method embodiment for building a product finder. A client, such as a website owner/developer or an online retailer, may want a product finder on a website to aid potential customers and consumers, such as web surfers and online shoppers, in finding products and items of interest. The client may utilize a product finder builder to develop a product finder. A method for building a product finder may include receiving a request 1302 (e.g., from a client) at a product finder developer to develop a product finder, or to modify an existing product finder. The product finder may be for one or more specific products or product categories. In other words, the request may be to develop a product finder configured to find a specific product or type of product. For example, a product finder may be configured to find televisions, smartphones, and so forth.

A client may have product information relating to a specific product(s) or product category(ies). The product information may include an identifier for the products or categories. The client may provide the product information as input to the product finder builder. Input to configure the product finder may be received 1304 by a product finder developer. For example, the input may include data such as the product name, brand name, manufacturer name, marketing description, technical specifications, images, videos, ratings, reviews, price, availability, and other product information.

Figure 14:
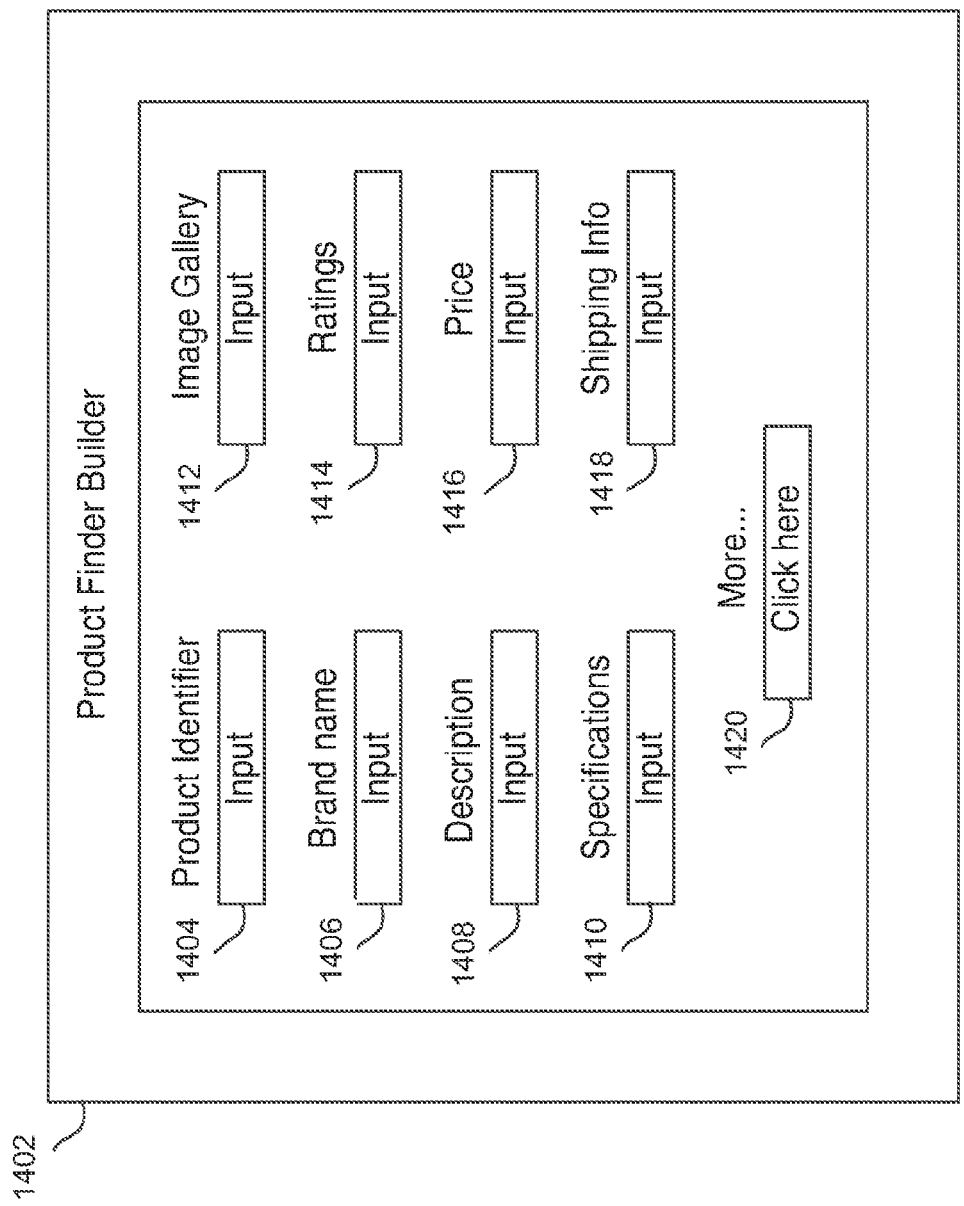
FIG. 14 illustrates an exemplary system embodiment for a product finder builder.

FIG. 14 shows an exemplary product finder builder 1402. The system embodiment for the product finder builder 1402 allows the client to input e.g., type in, select, upload, or otherwise indicate various product information, such as the product identifier(s) 1404, the brand/manufacturer name 1406, the description/overview 1408, the features/technical specifications 1410, pictures 1412, ratings/reviews 1414, price 1416, shipping information 1418, and other information 1420. For an entire product category (e.g., cameras), the client may upload files (e.g., a spreadsheet) for the product information instead of through manual data entry methods. In an alternative embodiment, a maintainer of the product finder builder 1402 may provide a database of information describing a set of products and/or services, from which a user may simply select products or indicate criteria by which the set of products may be filtered to generate a list of products for use with the product finder. According to embodiments, the product finder builder 1402 may be arranged in a modular configuration, wherein options (e.g., user input 1204 options) may be specified in one or more customer settings (e.g., stored with customer information, such as a customer account 1007). For example, if a customer seeks to develop or modify a product finder, for instance, modifying a sequence of questions (e.g., asking for price first, brand second, availability third), adding or removing questions, changing a list of available options associated with certain products or questions, then these features may be specified by customer settings removing the need for customized software development.

The client may not have any other product information relating to a product(s) or category(ies) other than a product identifier(s). A product identifier may be, for example, a name of a product, a model number of a product type, a serial number for a product, a name for a product type/category, a combination thereof, or any other element capable of identifying a product. The client may input the product identifier(s) to the product finder builder. The product finder builder may communicate with a database having product information relating to the product(s) or category(ies) corresponding to the product identifier(s). The database may store product information for the requested product(s) or product category(ies) such as the product name, brand name, manufacturer name, product type, marketing description, technical specifications, price, availability, and other product information.

Figure 15:
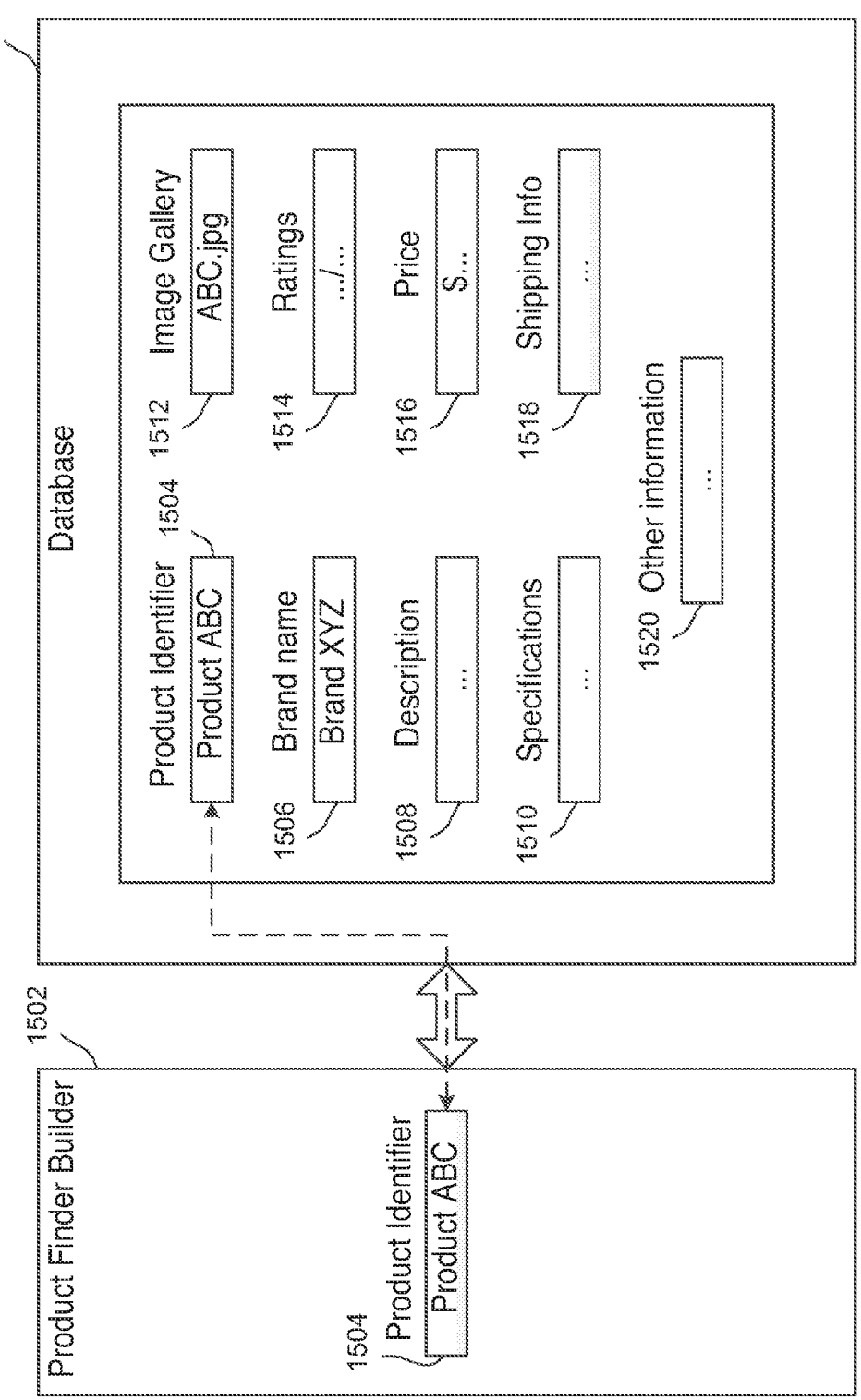
FIG. 15 illustrates an exemplary system embodiment for a product finder builder communicating with a product information database.

FIG. 15 shows an exemplary system embodiment for a product finder builder 1502 communicating with a product information database 1522. If the client does not have any product information other than the product identifier, the product finder builder 1502 may take the product identifier 1504 specified by the client (e.g., "Product ABC") and retrieve product information corresponding to "Product ABC" from the database 1522. The product information may include, for example, the product identifier 1504, the brand/manufacturer name 1506, the description/overview 1508, the features/technical specifications 1510, pictures 1512, ratings/reviews 1514, price 1516, shipping information 1518, and other information 1520. Similarly, the product finder builder may retrieve the same or similar information for an entire product category (e.g., televisions).

Referring back to FIG. 13, using the received input, a system configured to practice the exemplary method embodiment may develop 1306 the product finder based on an existing template. The template may be stored in the product finder builder or the product information database. Building the product finder from an existing template obviates the need to write and/or rewrite the computer code for the product finder. In other words, the template may already be set up for developing a product finder; the template may receive product information as input to create or modify the product finder using the received input 1306, thereby resulting in a product finder configured for finding the requested product(s) and/or category(ies).

For example, an online retailer of cameras may provide product data including camera names, model numbers, descriptions, specifications, and prices, for a line of cameras being sold. The product finder builder may receive the data as input and create a product finder for the cameras based on an existing product finder template and by incorporating the received data into the template. In other words, the template may already be configured to build the product finder's appearance, interface, functions, and the like, but may still require all of the product data. The retailer may provide the product data (e.g., directly by inputting the data, or indirectly by providing a product identifier(s) which correlates to product information in a database). As such, a product finder customized for the camera retailer (i.e., a product finder containing the product data entered for the requested product/category) may be created with reduced time, effort, and cost. If the online retailer sells tripods as well, the retailer may input product information about tripods, and a product finder for tripods may be developed based on the entered product information about tripods without having to completely recreate the product finder. The online retailer may repeat this for any other item or line of items as well. As a result, much time, effort, and cost may be saved.

The product finder builder may monitor end user (e.g., website visitor, online shopper) behavior to obtain information, for example, to generate a decision tree to structure the product finder (and/or the template on which the product finder is based). For example, the product finder builder may monitor online shopper behavior and observe that most shoppers select a price range first before selecting a brand. If so, the product finder builder may generate a decision tree for developing and structuring the product finder such that, for example, it allows users to select prices before brands.

Referring back to FIG. 13, the system configured to practice the exemplary method embodiment may grant access 1308 to the developed product finder. For example, when the product finder has been developed, the system configured to practice the exemplary method embodiment may provide the developed product finder to a client to implement on a website. As such, it is possible for a client website to include a product finder customized according to the client's needs (e.g., based on the client's previous request and/or input), without the client or associated web developer having to create the actual code for the product finder.

The method may grant access 1308 to the developed product finder by providing a snippet of computer code. For example, the product finder builder may provide a snippet of JavaScript® computer code to the client. The client may implement the snippet of code in a website to generate a widget for finding products. As a result, without having to focus on developing the actual computer code for generating the product finder, the client's website may nonetheless feature a product finder widget built and/or customized based on the client's previous input.

The product finder widget may provide access to a product finder that resides or is hosted on a remote server. In other words, a developed product finder may reside on or be hosted by a remote server. Moreover, product finder development may occur on the remote server (e.g., by a product finder builder on the server). If so, the product finder widget on the client's website may serve as an interface for accessing and using the product finder on the remote server.

Figure 16:
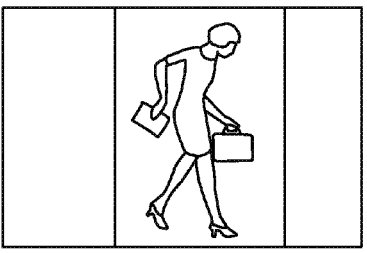
FIG. 16 illustrates an exemplary embodiment including a widget for accessing a product finder.

An exemplary embodiment including a widget for accessing a product finder is illustrated in FIG. 16. The widget may be implemented on any website such that when a webpage visitor moves or places a mouse pointer over a product identifier, for example, the widget may appear and provide an interface for the product finder. Then via the widget, the visitor may input selections to find a product of interest. The widget may be incorporated directly into the code of the website, such that the widget appears to be seamlessly integrated with the website, even though the widget may interact with external resources (e.g., code and data) on a different server. In this manner, the widget embedded within the website may remain static, but the information served by the different server may be dynamic, based on inputs from the user to other parts of the website, and based on user profile or account information available to the different server through the website.

FIG. 17 illustrates an exemplary embodiment including a widget for accessing a product finder having retrieved results from a search query. The product finder may display the product(s) and the respective product information resulting from the visitor's selection(s). A sorting function may organize the results. The visitor may also choose to compare a number of products and product information resulting from the query.

With reference to FIG. 13 again, the system may optionally collect data 1310 from the developed product finder for processing, aggregating, and/or analysis. For example, if the product finder is implemented as a widget on the client's website, then the product finder widget may send queries to a remote server when a web site visitor uses the product finder widget. As such, the system configured to practice the method embodiment may collect data about the queries without additional processing on the part of the client website. The query and any information within the query may be aggregated, analyzed, and subjected to further processing. For example, data regarding which products visitors tend to search for using the product finder can be beneficial for sales, marketing, advertising, research, and other purposes.

The product finder builder may reside or be hosted on a remote server. The product finder builder and the product information database may reside on or be hosted by the same server. In addition, the product finder builder may include the database. The product finder builder and the product information database may reside on or be hosted by different servers.

The product finder builder may be an application and may be presented to the client via a widget. The product finder builder may itself be a widget or it may be accessed through a widget. A product finder builder widget may be hosted on a remote server. A widget may be hosted on the remote server along with the product finder builder, wherein the widget on the remote server may provide an interface for accessing the product finder builder.

For example, a client (e.g., online retailer, website owner/developer) desiring to implement a product finder on a website may access the remote server via the widget to use the product finder builder. The client may visit the remote server (e.g., a webpage of the remote server), request to develop a product finder, and interact with the product finder builder widget to input product information to develop a product finder customized for the client (i.e., based on his request and input).

The product finder and/or the product finder builder may be generated from computer code including JavaScript®, jQuery, HTML, HTML5, or any combination of these and/or other programming languages. Widgets for the product finder and/or the product finder builder can be JavaScript® hooks and/or other script elements.

Embodiments disclosed herein may take the form of an entirely hardware embodiment, an entirely software embodiment, or an embodiment containing both hardware and software elements and modules. Software may include, but is not limited to, firmware, resident software, microcode, and the like. Furthermore, embodiments may take the form of computer program products accessible from non-transitory computer-usable or computer-readable mediums providing program code for use by or in connection with a computer or any instruction execution system.

A data processing system suitable for storing program code and for executing program code will include at least one processor, processor circuits, or other processor resources, coupled directly or indirectly to memory elements through a system bus, or chipset. The memory elements can include local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 18:
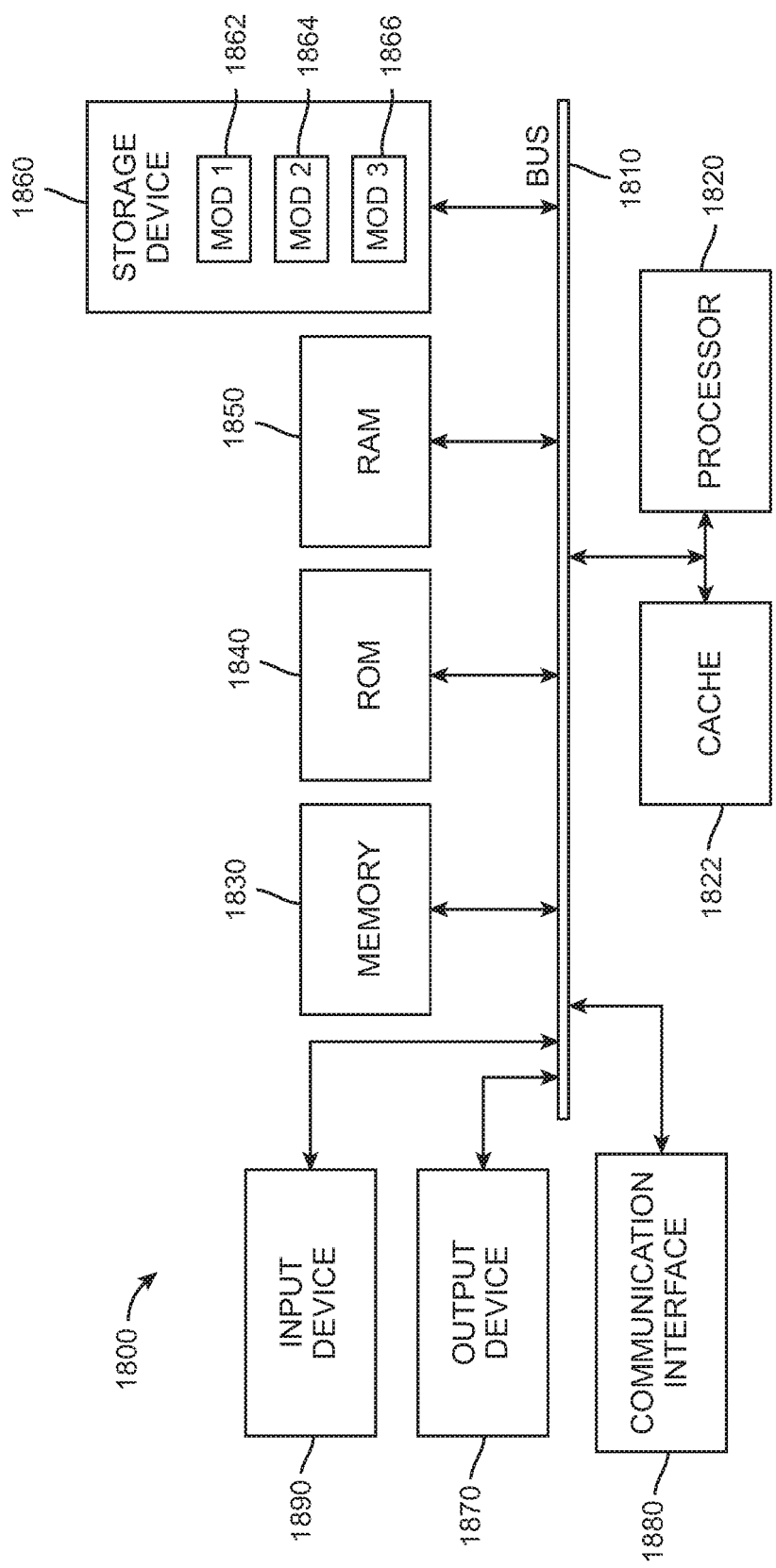
FIG. 18 illustrates an exemplary system, including a general-purpose computing device.

For example, FIG. 18 illustrates an exemplary system 1800, and includes a general-purpose computing device 1800, including a processing unit (CPU, processor, or processor circuit) 1820 and a system bus 1810 that couples various system components including the system memory 1830 such as read only memory (ROM) 1840 and random access memory (RAM) 1850 to the processor 1820. The system 1800 can include a cache of high speed memory connected directly with, in close proximity to, or integrated as part of the processor 1820. The system 1800 copies data from the memory 1830 and/or the storage device 1860 to the cache for quick access by the processor 1820. In this way, the cache provides a performance boost that avoids processor 1820 delays while waiting for data. These and other modules can control or be configured to control the processor 1820 to perform various actions. Other system memory 1830 may be available for use as well. The memory 1830 can include multiple different types of memory with different performance characteristics. For example, the memory 1830 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 18, the memory 1830 can include non-volatile memory and/or volatile memory.

It can be appreciated that the principles set forth herein may operate on a computing device 1800 with more than one processor 1820 or on a group or cluster of computing devices networked together to provide greater processing capability. The processor 1820 can include any general purpose processor and a hardware module or software module, such as module 1 1862, module 2 1864, and module 3 1866 stored in storage device 1860, configured to control the processor 1820 as well as a special-purpose processor where software instructions are incorporated into the actual processor design. The processor 1820 may essentially be a completely self-contained computing system, containing multiple cores or processors, a bus, memory controller, cache, etc. A multi-core processor may be symmetric or asymmetric.

The system bus 1810 may be any of several types of bus structures including a memory bus or memory controller, a peripheral bus, and a local bus using any of a variety of bus architectures. A basic input/output (BIOS) stored in ROM 1840 or the like, may provide the basic routine that helps to transfer information between elements within the computing device 1800, such as during start-up. The computing device 1800 further includes various types of computer-readable storage media 1860 such as a hard disk drive, a magnetic disk drive, an optical disk drive, tape drive, or the like. The storage device 1860 can include software modules 1862, 1864, 1866 for controlling the processor 1820. Other hardware or software modules are contemplated. The storage device 1860 is connected to the system bus 1810 by a drive interface. The drives and the associated computer readable storage media provide nonvolatile storage of computer readable instructions, data structures, program modules and other data for the computing device 1800. In one aspect, a hardware module that performs a particular function includes the software component stored in a non-transitory computer-readable medium in connection with the necessary hardware components, such as the processor 1820, bus 1810, display 1870, and so forth, to carry out the function. The basic components are known to those of skill in the art and appropriate variations are contemplated depending on the type of device, such as whether the device 1800 is a small, handheld computing device, a desktop computer, or a computer server.

Although the exemplary embodiment described herein employs the hard disk 1860, it should be appreciated by those skilled in the art that other types of computer readable media which can store data that are accessible by a computer, such as magnetic cassettes, flash memory cards, digital versatile disks, cartridges, random access memories (Rams) 1850, read only memory (ROM) 1840, a cable or wireless signal containing a bit stream, and the like, may also be used in the exemplary operating environment. Non-transitory computer-readable storage media expressly exclude media such as energy, carrier signals, electromagnetic waves, and signals per se.

To enable user interaction with the computing device 1800, an input device 1890 represents any number of input mechanisms, such as a microphone for speech, a touch-sensitive screen for gesture or graphical input, keyboard, mouse, motion input, speech, and so forth. An output device 1870 can also be one or more of a number of output mechanisms known to those of skill in the art. In some instances, multimodal systems enable a user to provide multiple types of input to communicate with the computing device 1800. The communications interface 1880 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment of FIG. 18 is presented as including individual functional blocks including functional blocks labeled as a "processor" or processor 1820. The functions these blocks represent may be provided through the use of either shared or dedicated hardware, including, but not limited to, hardware capable of executing software and hardware, such as a processor 1820, that is purpose-built to operate as an equivalent to software executing on a general purpose processor. For example the functions of one or more processors presented in FIG. 18 may be provided by a single shared processor or multiple processors (use of the term "processor" should not be construed to refer exclusively to hardware capable of executing software). Illustrative embodiments may include microprocessor and/or digital signal processor (DSP) hardware, read-only memory (ROM) 1840 for storing software performing the operations discussed below, and random access memory (RAM) 1850 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 1800 shown in FIG. 18 can practice all or part of the recited methods, can be a part of the recited systems, and/or can operate according to instructions in the recited non-transitory computer-readable storage media. Such logical operations can be implemented as modules configured to control the processor 1820 to perform particular functions according to the programming of the module. For example, FIG. 18 illustrates three modules Mod1 1862, Mod2 1864 and Mod3 1866 which are modules configured to control the processor 1820. These modules may be stored on the storage device 1860 and loaded into RAM 1850 or memory 1830 at runtime or may be stored as would be known in the art in other computer-readable memory locations.

Other embodiments may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of what is set forth herein. For example, the principles herein can be used to host many different types of information other than consumer electronics product information, for example, information regarding sporting goods, cars, medicine, etc. Those skilled in the art will readily recognize various modifications and changes that may be made to the principles described herein without following the example embodiments and applications illustrated and described herein, and without departing from the spirit and scope of the disclosures.

What is claimed is:

1. A method executed by one or more computing devices for generating a product finder, the method comprising:

receiving, by at least one of the one or more computing devices, a request to generate the product finder for a specified product category;

receiving, by at least one of the one or more computing devices, one or more requirements pertaining to the product finder;

identifying, by at least one of the one or more computing devices, a template based at least in part on the specified product category, wherein the template includes one or more selectable attributes associated with the specified product category, wherein the template is generated by:

monitoring user behavior on one or more websites relating to the specified product category to obtain behavior information;

generating a decision tree modeling the behavior information; and structuring the template based at least in part on the decision tree; and generating, by at least one of the one or more computing devices, the product finder by customizing the template based on the one or more requirements, the product finder being incorporated into a third party web page of a third party web server such that it appears integrated with the third party web page while being hosted by a web server other than the third party web server and configured to receive a selection of at least one selectable attribute in the one or more selectable attributes, query a product information database to retrieve product result information corresponding to the at least one selectable attribute, and return the product result information within the product finder.

2. The method of claim 1, wherein the product result information is formatted into a website development language compatible with the product finder after retrieval from the product information database.

3. The method of claim 1, wherein the one or more requirements include one or more of site requirements, data requirements, or product requirements.

4. The method of claim 3, wherein the product requirements include one or more of a product name, a brand name, a manufacturer name, a marketing description, a technical specification, an image, a video, a rating, a review, a price, or availability information, generating the product finder comprises loading information relating to the product requirements into the template.

5. The method of claim 3, wherein the site requirements comprise one or more of site size, site dimensions, and site layout and wherein generating the product finder comprises customizing the template to fit the site requirements.

6. The method of claim 5, further comprising:
collecting, by at least one of the one or more computing devices, information relating to any queries submitted by the product finder to the product information database.

7. A system for generating a product finder, the system comprising:
one or more processors; and
one or more memories operatively coupled to at least one of the one or more processors and having instructions stored thereon that, when executed by at least one of the one or more processors, cause at least one of the one or more processors to:
receive a request to generate the product finder for a specified product category;
receive one or more requirements pertaining to the product finder;
identify a template based at least in part on the specified product category, wherein the template includes one or more selectable attributes associated with the specified product category, wherein the template is generated by:
monitoring user behavior on one or more websites relating to the specified product category to obtain behavior information;
generating a decision tree modeling the behavior information; and
structuring the template based at least in part on the decision tree; and
generate the product finder by customizing the template based on the one or more requirements, the product finder being incorporated into a third party web page of a third party web server such that it appears integrated with the third party web page while being hosted by a web server other than the third party web server and configured to receive a selection of at least one selectable attribute in the one or more selectable attributes, query a product information database to retrieve product result information corresponding to the at least one selectable attribute, and return the product result information within the product finder.

8. The system of claim 7, wherein the product result information is formatted into a website development language compatible with the product finder after retrieval from the product information database.

9. The system of claim 7, wherein the one or more requirements include one or more of site requirements, data requirements, or product requirements.

10. The system of claim 9, wherein the product requirements include one or more of a product name, a brand name, a manufacturer name, a marketing description, a technical specification, an image, a video, a rating, a review, a price, or availability information, and wherein the instructions that, when executed by at least one of the one or more processors, cause at least one of the one or more processors to generate the product finder further cause at least one of the one or more processors to:
load information relating to the product requirements into the template.

11. The system of claim 9, wherein the site requirements comprise one or more of site size, site dimensions, and site layout and wherein the instructions that, when executed by at least one of the one or more processors, cause at least one of the one or more processors to generate the product finder further cause at least one of the one or more processors to:
customize the template to fit the site requirements.

12. The system of claim 7, wherein at least one of the one or more memories has further instructions stored thereon that, when executed by at least one of the one or more processors, cause at least one of the one or more processors to:
collect information relating to any queries submitted by the product finder to the product information database.

13. At least one non-transitory computer-readable medium storing computer-readable instructions that, when executed by one or more computing devices, cause at least one of the one or more computing devices to:
receive a request to generate a product finder for a specified product category;
receive one or more requirements pertaining to the product finder;
identify a template based at least in part on the specified product category, wherein the template includes one or more selectable attributes associated with the specified product category, wherein the template is generated by:
monitoring user behavior on one or more websites relating to the specified product category to obtain behavior information;
generating a decision tree modeling the behavior information; and
structuring the template based at least in part on the decision tree; and
generate the product finder by customizing the template based on the one or more requirements, the product finder being incorporated into a third party web page of a third party web server such that it appears integrated with the third party web page while being hosted by a web server other than the third party web server and configured to receive a selection of at least one selectable attribute in the one or more selectable attributes, query a product information database to retrieve product result information corresponding to the at least one selectable attribute, and return the product result information within the product finder.

14. The at least one non-transitory computer-readable medium of claim 13, wherein the product result information is formatted into a website development language compatible with the product finder after retrieval from the product information database.

15. The at least one non-transitory computer-readable medium of claim 13, wherein the one or more requirements include one or more of site requirements, data requirements, or product requirements.

16. The at least one non-transitory computer-readable medium of claim 15, wherein the product requirements include one or more of a product name, a brand name, a manufacturer name, a marketing description, a technical specification, an image, a video, a rating, a review, a price, or availability information, and wherein the instructions that, when executed by at least one of the one or more computing devices, cause at least one of the one or more computing devices to generate the product finder further cause at least one of the one or more computing devices to:

load information relating to the product requirements into the template.

17. The at least one non-transitory computer-readable medium of claim 15, wherein the site requirements comprise one or more of site size, site dimensions, and site layout and wherein the instructions that, when executed by at least one of the one or more computing devices, cause at least one of the one or more computing devices to generate the product finder further cause at least one of the one or more computing devices to:

customize the template to fit the site requirements.

18. The at least one non-transitory computer-readable medium of claim 13, further storing computer-readable instructions that, when executed by at least one of the one or more computing devices, cause at least one of the one or more computing devices to:

collect information relating to any queries submitted by the product finder to the product information database.

* * * * *